United States Patent
Spence et al.

(10) Patent No.: US 10,510,317 B2
(45) Date of Patent: *Dec. 17, 2019

(54) CONTROLLING DISPLAY PERFORMANCE WITH TARGET PRESENTATION TIMES

(71) Applicant: Apple Inc., Cupertino, CA (US)

(72) Inventors: Arthur L. Spence, San Jose, CA (US); Jeremy T. Sandmel, San Mateo, CA (US); David M. Chan, Palo Alto, CA (US); Chendi Zhang, Mountain View, CA (US); Peter C. Tsoi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,616

(22) Filed: Sep. 23, 2016

(65) Prior Publication Data

US 2017/0352322 A1    Dec. 7, 2017

Related U.S. Application Data

(60) Provisional application No. 62/345,539, filed on Jun. 3, 2016, provisional application No. 62/348,622, filed (Continued)

(51) Int. Cl.
*H04N 7/01* (2006.01)
*G06F 3/14* (2006.01)
(Continued)

(52) U.S. Cl.
CPC .......... *G09G 5/006* (2013.01); *G09G 3/3618* (2013.01); *G09G 5/12* (2013.01); *G09G 5/363* (2013.01);
(Continued)

(58) Field of Classification Search
None
See application file for complete search history.

(56) References Cited

U.S. PATENT DOCUMENTS

| 5,270,821 A | 12/1993 | Samuels |
| 5,870,683 A | 2/1999 | Wells et al. |

(Continued)

FOREIGN PATENT DOCUMENTS

| EP | 1439707 | 7/2004 |
| EP | 1439707 A2 | 7/2004 |

(Continued)

OTHER PUBLICATIONS

The International Search Report and the Written Opinion, International Serial No. PCT/US207/035773, dated Sep. 15, 2017, 14 pages.

(Continued)

*Primary Examiner* — Joni Richer
(74) *Attorney, Agent, or Firm* — Womble Bond Dickinson (US) LLP

(57) ABSTRACT

Embodiments described herein provide for a display system to generate and display data on a display device, the display system comprising one or more graphics processors to generate one or more frames of data for display on the display device; display logic to receive a request to display the one or more frames of data, the request including a requested presentation time in which the one or more frames of data are to be displayed; and a display engine to present the one or more frames of data to the display device for display at a target presentation time, the target presentation time derived from the requested presentation time, wherein the display engine is to adjust a refresh rate of the display device based on the target presentation time of the one or more frames of data.

17 Claims, 18 Drawing Sheets

Related U.S. Application Data on Jun. 10, 2016, provisional application No. 62/348,626, filed on Jun. 10, 2016, provisional application No. 62/348,631, filed on Jun. 10, 2016.

(51) Int. Cl.
  *G09G 5/36* (2006.01)
  *G09G 5/00* (2006.01)
  *G09G 3/36* (2006.01)
  *G09G 5/12* (2006.01)

(52) U.S. Cl.
  CPC ............. *H04N 7/01* (2013.01); *H04N 7/0127* (2013.01); *G06F 3/14* (2013.01); *G09G 2320/0252* (2013.01); *G09G 2330/021* (2013.01); *G09G 2340/0435* (2013.01); *G09G 2360/06* (2013.01); *G09G 2360/12* (2013.01); *G09G 2370/04* (2013.01)

(56) References Cited

U.S. PATENT DOCUMENTS

| | | | |
|---|---|---|---|
| 6,005,570 | A | 12/1999 | Gayraud et al. |
| 6,512,552 | B1* | 1/2003 | Subramanian ........... H04N 5/04 |
| | | | 348/423.1 |
| 7,535,478 | B2 | 5/2009 | Dunton et al. |
| 7,536,705 | B1 | 5/2009 | Boucher et al. |
| 7,643,422 | B1 | 1/2010 | Covell et al. |
| 7,692,642 | B2 | 4/2010 | Wyatt |
| 7,952,543 | B2 | 5/2011 | Chang et al. |
| 8,291,460 | B1 | 10/2012 | Peacock |
| 8,334,857 | B1 | 12/2012 | Ogrinc et al. |
| 8,345,600 | B2 | 1/2013 | Chang |
| 8,884,977 | B2 | 11/2014 | Wang |
| 8,902,248 | B1 | 12/2014 | Bidarkar et al. |
| 8,957,900 | B2 | 2/2015 | Lau et al. |
| 9,174,130 | B2 | 11/2015 | Oku |
| 9,240,031 | B1 | 1/2016 | Wang |
| 9,286,709 | B2 | 3/2016 | Nash |
| 9,674,562 | B1 | 6/2017 | Spracklen |
| 9,984,653 | B1 | 5/2018 | Madhvapathy et al. |
| 2001/0009035 | A1 | 7/2001 | Komata |
| 2005/0128220 | A1 | 6/2005 | Marrin et al. |
| 2006/0146185 | A1 | 7/2006 | Chen |
| 2007/0022215 | A1 | 1/2007 | Singer et al. |
| 2008/0151998 | A1 | 6/2008 | He |
| 2009/0167768 | A1 | 7/2009 | Bull et al. |
| 2010/0149414 | A1* | 6/2010 | Chen .................... H04N 7/0112 |
| | | | 348/447 |
| 2011/0145879 | A1 | 6/2011 | Rajamani |
| 2012/0311043 | A1 | 12/2012 | Chen |
| 2013/0016282 | A1 | 1/2013 | Kim |
| 2013/0086516 | A1 | 4/2013 | Rodgers |
| 2013/0141642 | A1 | 6/2013 | Wu et al. |
| 2013/0195205 | A1 | 8/2013 | Wang et al. |
| 2013/0257752 | A1 | 10/2013 | Tripathi et al. |
| 2013/0321472 | A1 | 12/2013 | Piemonte et al. |
| 2013/0328894 | A1 | 12/2013 | Moore et al. |
| 2013/0335425 | A1 | 12/2013 | Haase |
| 2014/0316868 | A1 | 10/2014 | Rosen et al. |
| 2014/0368519 | A1 | 12/2014 | Wood |
| 2014/0376618 | A1 | 12/2014 | Ma |
| 2015/0040059 | A1 | 2/2015 | Yuan |
| 2015/0348509 | A1 | 12/2015 | Verbeure |
| 2015/0379772 | A1 | 12/2015 | Hoffman |
| 2016/0065889 | A1* | 3/2016 | Maurice ................. H04N 19/44 |
| | | | 348/447 |
| 2016/0179679 | A1 | 6/2016 | Morris et al. |
| 2016/0275916 | A1 | 9/2016 | Glen |
| 2016/0335743 | A1 | 11/2016 | Konstantinov |
| 2016/0350056 | A1 | 12/2016 | Makar |
| 2017/0099515 | A1 | 4/2017 | Stokking |
| 2017/0329613 | A1 | 11/2017 | Croxford |

FOREIGN PATENT DOCUMENTS

| | | |
|---|---|---|
| EP | 2479984 | 7/2012 |
| EP | 2479984 A1 | 7/2012 |
| WO | WO-9801999 | 1/1998 |
| WO | WO-15071865 | 5/2015 |

OTHER PUBLICATIONS

U.S. Appl. No. 15/274,639, filed Sep. 23, 2016, Pending.
U.S. Appl. No. 15/274,658, filed Sep. 23, 2016, Pending.
U.S. Appl. No. 15/274,689, filed Sep. 23, 2016, Pending.
PCT International Preliminary Report on Patentability for PCT/US2017/035773 dated Dec. 13, 2018, 9 pages.

\* cited by examiner

CONTROLLING DISPLAY PERFORMANCE WITH TARGET PRESENTATION TIMES

CROSS-REFERENCE

The present application is a non-provisional application claiming the benefit of U.S. Provisional Application No. 62/345,539 filed on Jun. 3, 2016, and U.S. Provisional Application Nos. 62/348,622, 62/348,626, 62/348,631, all filed Jun. 10, 2016, which are hereby incorporated herein by reference.

BACKGROUND OF THE DISCLOSURE

Legacy display systems operate at a constant refresh rate in which a display image is updated at a fixed number of cycles per second. This fixed display refresh rate can create playback issues when displaying certain content. For example, a display panel having a 60 Hz refresh rate exhibit frame judder when viewing a 24 Hz movie, as the panel refreshes every 16.6 ms, whereas the frame is generated using 41.6 ms sample times, which is an uneven (e.g., 2.5) multiple of the frame duration. Accordingly, some frames are scanned by the display twice while others are scanned three times.

While some legacy displays allow the panel refresh rate to be reduced to a fixed refresh rate, visual quality may suffer. For example, blur may be introduced into animated or moving content when the display refresh rate is too low for the displayed content. Moving high spatial frequency images across the panel, such as text displayed while scrolling a web page or text document appears blurry when refreshed at a low rate. In general, the higher the refresh rate of a display device, the sharper displayed animation becomes. Thus, a moving image displayed on a display having a refresh rate of 120 Hz may yield a visibly sharper image and may allow the text on the scrolling image to be legible under circumstances where such text would be blurred an illegible at lower refresh rates.

Additionally, higher refresh displays provide benefits other than temporal visual quality. For example, for touch input displays, the latency between a touch input and displaying a result of the touch input may ultimately be gated by how quickly a new, updated frame can be presented on the display. For example, if a display refreshes at 60 Hz, then a new frame generated based on a touch input may have to wait until the beginning of the next 16 ms period. Provided that a new frame is ready for display, an 120 Hz display reduces the response time by half of that of a 60 Hz display.

However, in most devices, particularly mobile and handheld devices, the display hardware consumes a tremendous amount of the overall energy budget of the device. Increasing the refresh rate may further increase the already large energy demands of operating the display. For example, in some displays, operating the display at 120 Hz instead of the standard 60 Hz generally supported by displays may result in up to an 150% increase in display power requirements. Thus, for a mobile device, a high display refresh can have a significant negative impact on battery-based operating time.

SUMMARY OF THE DESCRIPTION

Various embodiments are described to enable the improved visual quality provide by higher refresh rates while balancing the additional energy requirements of increased refresh rates.

One embodiment provides for a display system to generate and display data on a display device, the display system comprising one or more graphics processors to generate one or more frames of data for display on the display device; display logic to receive a request to display the one or more frames of data, the request including a requested presentation time in which the one or more frames of data are to be displayed; and a display engine to present the one or more frames of data to the display device for display at a target presentation time, the target presentation time derived from the requested presentation time, wherein the display engine is to adjust a refresh rate of the display device based on the target presentation time of the one or more frames of data.

One embodiment provides for a non-transitory machine-readable medium storing instructions which, when executed by one or more processors, cause the one or more processors to perform operations to generate and display data on a display device, the operations comprising receiving a request to display one or more frames of data on a display device, the one or more frames of data generated via the one or more processors, wherein the request includes a requested presentation time in which the one or more frames of data are to be displayed; deriving a target presentation time based on the requested presentation time, the target presentation time derived based on a programming time for a display engine; programming the display engine to present the one or more frames of data to the display device for display; and adjusting a refresh rate of the display device based on the target presentation time of the one or more frames of data.

One embodiment provides for an electronic device comprising a variable refresh rate display device; one or more graphics processors to generate one or more frames of data for display on the variable refresh rate display device; display logic to receive a request to display the one or more frames of data, the request including a requested presentation time in which the one or more frames of data are to be displayed; and a display engine to present the one or more frames of data to the variable refresh rate display device for display at a target presentation time, the target presentation time derived from the requested presentation time, wherein the display engine is to adjust a refresh rate of the variable refresh rate display device based on the target presentation time of the one or more frames of data.

One embodiment provides for a display system to generate and display data on a display device, the display system comprising one or more graphics processors to generate one or more frames of data for display on the display device; a display engine to present the one or more frames of data to the display device for display; display logic to receive a request to display the one or more frames of data and generate one or more display events for the display engine based on the request, wherein the request includes a first hint to indicate a complexity of the one or more frames of data and the one or more display events includes a second hint derived from the first hint; and a performance controller to adjust one or more performance related parameters for the display system based on the second hint.

One embodiment provides for a non-transitory machine readable medium storing instructions which, when executed by one or more processors, cause the one or more processors to perform operations comprising receiving a request to display one or more frames of data on a display device of a display system, the request including a first hint to indicate a complexity of the one or more frames of data; generating one or more display events based on the request, the one or more display events including a second hint derived from the first hint; and signaling a performance controller associated with the one or more processors to adjust one or more performance related parameters of the one or more processors based on the second hint.

One embodiment provides for an electronic device comprising a display device having a variable refresh rate; one or more graphics processors to generate one or more frames of data for display on the display device; a display engine to present the one or more frames of data to the display device for display; display logic to receive a request to display the one or more frames of data and generate one or more display events for the display engine based on the request, wherein the request includes a first hint to indicate a complexity of the one or more frames of data and the one or more display events includes a second hint derived from the first hint; and a performance controller to adjust one or more performance related parameters for the display system based on the second hint.

One embodiment provides for a display system to generate and display data on a display device, the display system comprising one or more graphics processors to generate one or more frames of data for display on the display device; a window manager to submit a request to display the one or more frames of data; a display engine to present the one or more frames of data to the display device for display; and display logic to receive the request to display the one or more frames of data and generate one or more display events for the display engine based on the request to display the one or more frames of data, wherein the display logic is to manage a set of statistics associated with the request and periodically submit the set of statistics to the window manager, the set of statistics including a requested presentation time for a frame and an actual display time in which the frame is displayed on the display device.

One embodiment provides for a non-transitory machine readable medium storing instructions which, when executed by one or more processors of an electronic device, cause the one or more processors to perform operations comprising generating one or more frames of data at a first frame rate; submitting a request to display logic to display the one or more frames of data; receiving the request at the display logic and generating one or more display events for a display engine based on the request; processing the display events at the display engine to display the one or more frames of data; generating a set of statistics associated with processing the display events, the set of statistics including a requested presentation time for a frame and an actual display time in which the frame is displayed on the display device; and adjusting the first frame rate to a second frame rate based on the set of statistics.

One embodiment provides for an electronic device comprising a display device having a variable refresh rate; one or more graphics processors to generate one or more frames of data for display on the display device; a window manager to submit a request to display the one or more frames of data; a display engine to present the one or more frames of data to the display device for display; and display logic to receive the request to display the one or more frames of data and generate one or more display events for the display engine based on the request to display the one or more frames of data, wherein the display logic is to manage a set of statistics associated with the request and periodically submit the set of statistics to the window manager, the set of statistics including a requested presentation time for a frame and an actual display time in which the frame is displayed on the display device.

One embodiment provides for a method of generating and displaying data on a display device, the method comprising receiving an input to interact with an image presented via the display; generating a sequence of frames in response to the input, the sequence of frames having an animation frame rate independent of a current refresh rate of the display device, the animation frame rate determined based on a parameter associated with the input; configuring display events associated with the sequence of frames, the display events including configuration data to configure a display engine to display one or more frames in the sequence of frames, each frame in the sequence of frames having a requested presentation time based on the animation frame rate; processing a first display event associated with a first frame in the sequence of frames, wherein processing the first display event includes reading the configuration data to configure the display engine to display the first frame; presenting the configuration data to the display engine at a display time based on the requested presentation time; and dynamically refreshing the display device based on the display time to display the sequence of frames.

One embodiment provides for a non-transitory machine readable medium storing instructions which, when executed by one or more processors, cause the one or more processors to perform operations comprising receiving an input to interact with an image presented via a display device; generating a sequence of frames in response to the input, the sequence of frames having an animation frame rate independent of a current refresh rate of the display device, the animation frame rate determined based on a parameter associated with the input; configuring display events associated with the sequence of frames, the display events including configuration data to configure a display engine to display one or more frames in the sequence of frames, each frame in the sequence of frames having a requested presentation time based on the animation frame rate; processing a first display event associated with a first frame in the sequence of frames, the processing including reading the configuration data to configure the display engine to display the first frame; presenting the configuration data to the display engine at a display time based on the requested presentation time; and dynamically refreshing the display device based on the display time to display the sequence of frames.

One embodiment provides for a display system comprising a display device to display a first frame including a first image; an input device to receive a sequence of inputs to interact with the first image displayed within the first frame; one or more graphics processors to generate a second image for display within a second frame and a third image for display within a third frame, the first frame having a first requested presentation time and the third frame having a second requested presentation time; and a display engine to present the second frame for display at the first requested presentation time, present the third frame for display at the second requested presentation time, and cause the display device to dynamically refresh to display the second frame and the third frame, wherein a refresh rate of the display varies between display of the first frame, second frame, and third frame.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements, and in which.

DETAILED DESCRIPTION

Figure 1:
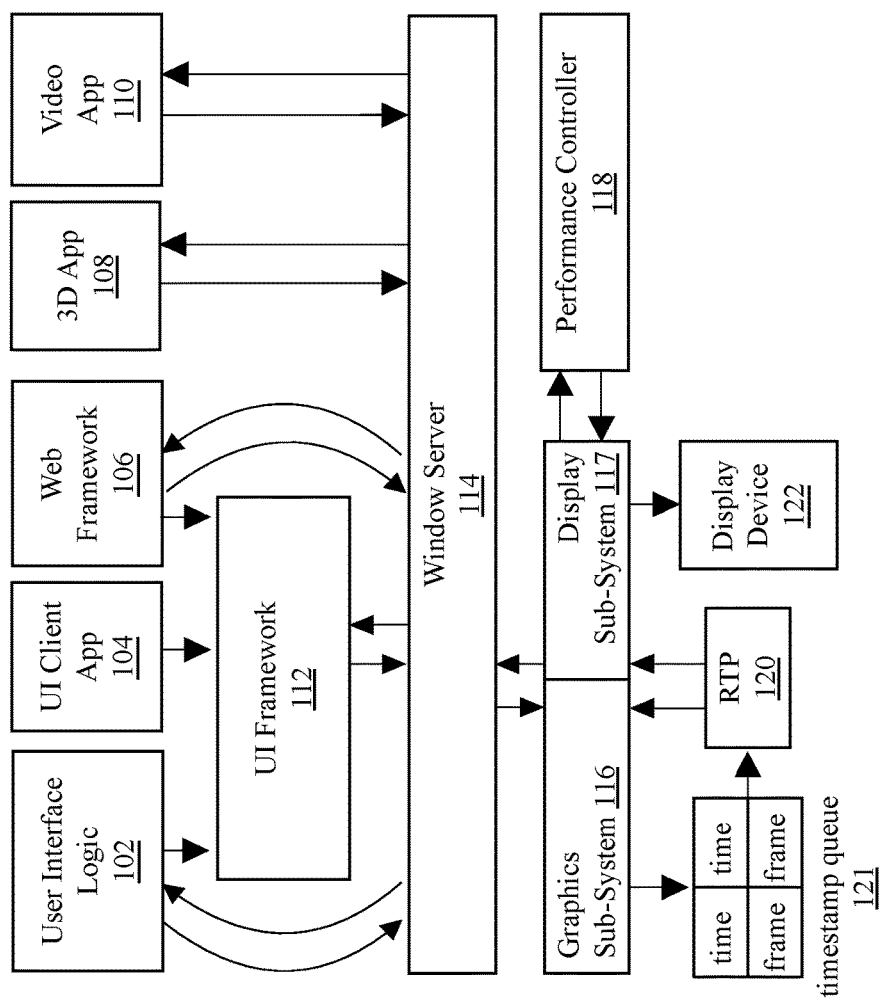
FIG. 1 is a block diagram of a graphics and display system, according to an embodiment.

Described herein is a system and method to enable improved visual quality provided by higher display refresh rates while balancing the additional energy requirements of increased refresh rates. One embodiment provides a system and method of dynamically controlling display performance based on content to be displayed. One embodiment provides a hardware accelerated display management framework that maintains backwards compatibility with legacy systems that lack display performance management hardware acceleration. Embodiments enable smooth displayable frame generation and presentation to display devices. In this context, smooth means extremely low judder at potentially arbitrary frame arrival intervals.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Moreover, specific details of embodiments are illustrated in detail in certain figures, but in differing detail in others. One having ordinary skill in the art will understand that details shown and/or illustrated for one embodiment may be combined with details shown and/or illustrated for other, similar embodiments. In certain instances, well-known or conventional details are not described in order to provide a concise discussion of various embodiments of the present invention.

The processes depicted in the figures that follow are performed by processing logic that comprises hardware (e.g. circuitry, dedicated logic), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

In embodiment described herein, frame generation and display can be enabled via a display architecture comprising multiple components and sub-components across multiple layers of the software and hardware. In one embodiment the components include a display kernel driver, three-dimensional (3D) graphics application programming interfaces (API), user input frameworks, animation frameworks, window managers, graphics processors, and display engines. Some embodiments additionally provide for one or more real-time processors (RTP) configured to execute display performance management logic. Additional embodiments provide for a system performance controller that manages and configures performance parameters for the processing and input/output (I/O) subsystems of an electronic device One embodiment enables a system to generate frames at different frame durations without introducing judder. Each frame is associated with a specified presentation time that is honored by the display system. A display engine can be configured to refresh a display device at an appropriate time to match the animation rate of an incoming frame. For example, a 3D game can be configured to generate a frame at logical time 0, which represents a current time, or a frame for immediate display. The 3D game can then advance the scene by 8 ms an immediately generate a new frame with a timestamp of 8 ms. The 3D game can then advance the scene by 12 ms and generate a frame with a timestamp of 20 ms. A display driver on the system will then see three frames within a display queue, each frame specified for different display times, with a different amount of time between frames. The frames within a display queue can be processed in turn at the specified presentation times to be sent to a display device. The display device can then dynamically refresh to match the refresh rate of each frame.

Embodiments provide a software stack of multiple software elements configured to interface with the hardware components to implement the display system. In one embodiment the software elements include a display driver to program a display engine to display image data on the display device, a window server to manage the submission of application data to the display driver, and window clients to generate image data for display.

The display driver can program the display engine to display image data on the display device in response to requests to display frames of image data. In one embodiment the display driver manages a queue including configuration data for frames to present on the display device. Each frame has an associated presentation time stamp associated with the requested presentation time for the frame. When the current time matches a frame's target presentation time, which is the requested presentation time minus an amount of time to account for the programming of the display hardware, the display driver can program the hardware to display the frame. In one embodiment, the image data for a frame can include a single surface for display or multiple, separate surfaces that are composited to create the frame. In one embodiment, the composition is performed by the display engine when presenting the frame. In one embodiment a graphics engine performs the composition prior to displaying the frame.

In addition to a requested presentation time, the configuration (control plane) data for a frame can include one or more hints from an application, framework, or the window server. The hints can provide additional details regarding the frame, such as the relative complexity of the current frame or an upcoming frame in the sequence of frames. For example a current frame can be composed of several surfaces that are to be blended to create the final frame. An upcoming frame can be based on a large number of geometric objects or can include a large number of shader programs. These hints can be a leading indicator that additional display or graphics processing resources may be required. Accordingly, the real time processor, in one embodiment, can look ahead in the timestamp queue to determine whether the performance controller should be made aware of a current or pending requirement for additional resources. The real time processor can then signal the performance controller to adjust performance related parameters for the system. For example, for upcoming complex events, the real time processor can pass the hint data for an upcoming frame to the performance controller and, if thermal and/or power budget is available, the performance controller can increase the clock rate associated with an application processor, graphics processor, and/or display engine. In one embodiment, a communication fabric that links the various hardware components (e.g., application processor, graphics processor, memory, etc.) can also be adjusted based on the hint information to temporarily increase fabric bandwidth allocation limits for data transfer between the graphics and display components within the system.

The window server is configured to master the display of image data from window client applications. An example window server is the CoreAnimation graphics rendering and animation framework of iOS™ and OS X®, which are provided by Apple Inc. of Cupertino Calif. However, embodiments are not limited to any particular operating system, window server, or window server implementation. Client applications of the window server provide data that describes the content to be displayed on a display device. In one embodiment the clients describe the content via trees of layers that are composited and rendered into a finished frame for display. The window server can generate implicit animations, in which a client application provides images to the window server and the window server can generate a sequence of animated frames based on the provided images. Clients may also enqueue finished into an image queue of the window server. In one embodiment the window server collects statistics generated and provided for a frame (e.g., by the display driver in one embodiment) and can vend the statistics to client applications as appropriate. For example, for explicit animations generated by client applications, the window server can provide statistics for those frames. For implicit animations, the window server can monitor the statistics for window server generated frames.

In one embodiment the electronic device includes a system performance controller which can be made aware of requested and actual presentation statistics. If applications, frameworks, or other display clients appear to be struggling to achieve or maintain target animation rate targets, then the performance controller may choose to increase the system performance state, provided there is energy and thermal headroom available. If the system has been experiencing a high level of energy consumption over a recent period, then the system performance controller may choose to lower the system's performance state and request a slower frame queue drain rate from the display driver. Reducing the system performance state may force display clients to become late presenting frames for display, which the clients can respond to by decreasing animation rates, further lowering energy consumption within the system.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2016 Apple Inc.

Display Architecture

FIG. 1 is a block diagram of a graphics and display system 100, according to an embodiment. The display system provided by embodiments described herein includes various layers of software and hardware. In one embodiment, software layers include one or more applications, such as a user interface (UI) logic 102, a UI client application (UI client app 104), a 3D application (3D app 108), and a video application (video app 110). Software layers can additionally include application frameworks such as a web framework 106 and a UI framework 112. The web framework 106 can provide functionality to web browser applications and can interface with the UI framework 112. UI client applications 104 and user interface logic 102 can derive user interface functionality from the UI framework 112.

One embodiment provides for a window server 114 and driver logic, such as display driver and/or graphics driver components of a graphics sub-system 116 and display sub-system 117. The window server 114 can relay display requests from the user interface logic 102, web framework 106, 3D app 108, and/or video app 110. The window server 114 can also relay display requests for the UI client app 104 received via the UI framework 112.

One embodiment provides for hardware layers include a graphics sub-system 116 including a graphics processor. The graphics processor can include one or more graphics engines. Embodiments additionally provide for a display sub-system 117 including a display engine. Hardware for the graphics sub-system 116 and display sub-system 117 may be integrated within a single graphics processor or one or more graphics processors. In one embodiment the single graphics processor or one or more graphics processors of the graphics sub-system 116 and/or display sub-system 117 can be integrated into a system on a chip integrated circuit for use in mobile and/or embedded devices. In one embodiment, hardware for the graphics sub-system 116 and display sub-system 117 may be in separate devices, for example, where the graphics and display system 100 is configured for use in a desktop or workstation platform.

In one embodiment a performance controller 118 controls power and performance parameters for the graphics subsystem 116 and the display sub-system 117. The performance controller can adjust performance parameters such as a clock frequency or voltage associated with the graphics subsystem 116 and the display sub-system 117. The voltage, frequency, and/or other power and performance parameters of the graphics subsystem 116 and/or the display sub-system 117 can be adjusted in unison for each of the graphics subsystem 116 or the display sub-system 117, or the power and performance parameters can be independently varied. For example, one or more components of the display sub-system 117 can be temporarily power off while the graphics subsystem 116 can continue to operate. Likewise, one or more components of the graphics subsystem 116 can be powered off while the display sub-system 117 continues to operate.

In one embodiment the performance controller 118 adjusts power and performance parameters of the graphics subsystem 116 and the display sub-system 117 based on utilization and workload, such that increased performance is available to process larger workloads, within thermal limits imposed by thermal management logic. In one embodiment the performance controller 118 is a closed loop performance controller (CLPC) and can pre-actively adjust power and performance parameters of the graphics subsystem 116 and the display sub-system 117 based on input from scheduling logic within the graphics sub-system 116.

In one embodiment, a real-time processor 120 (RTP) is additionally included to manage the processing and presentation of frames to and from the graphics sub-system 116 and display sub-system 117. The real-time processor 120 can process frame requests from a timestamp queue 121 at a requested display time and present the display request to a display engine within the display sub-system 117. Entries can be inserted into the timestamp queue 121 via a driver logic of the graphics sub-system 116 and/or the display sub-system 117 at the request of the window server 114.

In one embodiment, driver logic associated with the graphics sub-system 116 (e.g., graphics driver logic) can be used to insert frames into the timestamp queue 121 for display. In one embodiment the display sub-system 117 includes separate software logic to manage the insertion of frames in the timestamp queue 121. In one embodiment, the real-time processor 120 can also provide hints or feedback to the performance controller 118 based on contents of the timestamp queue.

The display sub-system 117 can couple with a display device 122. Embodiment provides for a display device 122 has electrical properties sufficient to support a variable refresh-rate on a frame-by frame basis. For example and in one embodiment, the display device 122 includes a display panel having materials sufficient to hold a display charge for longer than 16 ms without flickering, to enable sub-60 Hz refresh rates. In one embodiment the display device includes refresh logic that can refresh the display panel at up to 120 Hz.

In one embodiment the real-time processor 120 is configured to monitor the electrical state of the display device in conjunction with monitoring the content of the frame and determine the precise duration in which a frame may be displayed without refresh before flickering will be observable on the display. For example, in some flat panel display devices, displaying a luminance value in a range through a panel depending mid-grey value may be more difficult to display in comparison to other luminance values and will cause flicker more quickly than other luminance values. To prevent flickering the real-time processor 120 can issue a command to refresh the panel without software input. Such automatic refreshes will not interfere with software requested presentation times for new frames. In one embodiment, the non-interference of automatic refreshes is enforced by the display sub-system 117 and/or refresh logic within the display device 122.

In one embodiment, applications such as a 3D application (e.g., 3D app 108) can provide a completed frame to the window server 114 for display. For example, a client application can generate finished frames using the Metal™ API, OpenGL® API, or any other image API. The 3D application can schedule a frame to be rendered by the graphics-subsystem 116. The graphics sub-system 116 can render the frame and the window server 114 can facilitate insertion of the completed frame into the timestamp queue 121. In one embodiment some applications can provide animation key-frames to the window server 114. The window server 114 can then generate additional, interpolated frames to enable smooth animation of the transitions between the key-frames. The key-frames and the transition frames can be scheduled within the timestamp queue 121 for processing.

In one embodiment, applications such as a video application (e.g., video app 110) or an application supported by the UI framework 112 can provide finished frames or can provide multiple surfaces to the window server 114 to be composited into a final frame. For example, the video app 110 can provide a video frame that will be composited with user interface controls or subtitles, or the UI client app 104, via the UI framework 112, can request the window server 114 to display a user interface that is a composite of multiple surfaces.

Figure 2:
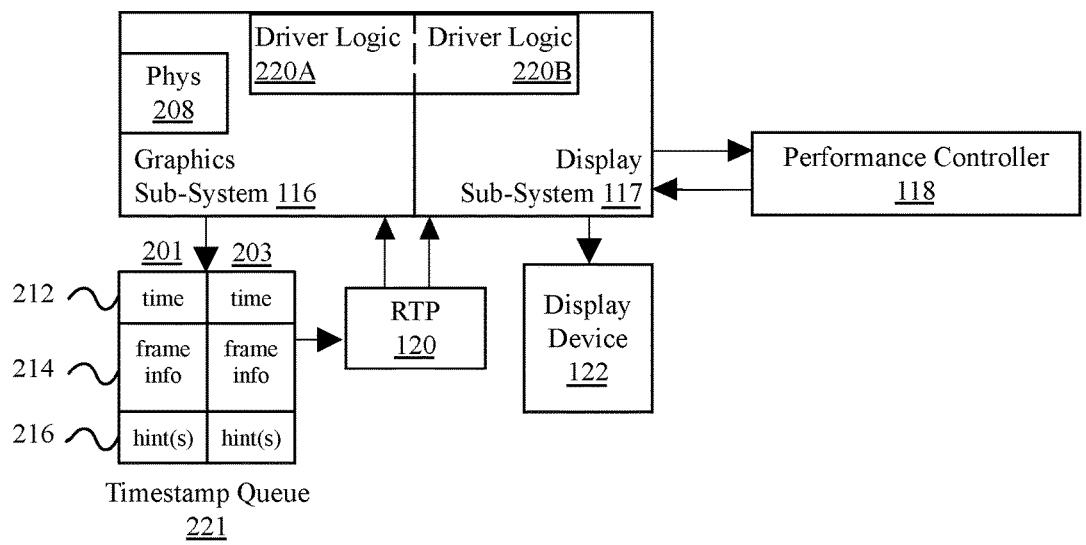
FIG. 2 is a block diagram illustrating a graphics and display sub-system, according to an embodiment.

FIG. 2 is a block diagram illustrating a graphics and display sub-system 200, according to an embodiment. The illustrated graphics and display sub-system 200 provides an additional view of components and sub-components of the graphics and display system 100 of FIG. 1. In one embodiment the graphics and display sub-system 200 includes driver logic 220 (e.g., driver logic 220A, driver logic 220B) to manage the graphics sub-system 116 and/or display sub-system 117. In one embodiment the driver logic 220 includes driver logic 220A to manage the graphics sub-system 116 and driver logic 220B to mange the display sub-system 117.

In one embodiment the graphics sub-system 116 includes a dedicated physics engine (phys 208) to use in calculating parameters for future frames. The physics engine can be used, in one embodiment, to generate projections for future frames based on current frame data. The projections for future frames can be used to pre-render a set of frames for timed presentation by the display sub-system 117.

One embodiment provides a timestamp queue 221, which can be a variant of the time-stamp queue 121 of FIG. 1. The illustrated time-stamp queue 221 includes an entry 201, 203 for each frame to be processed by the display sub-system 117. In one embodiment each entry 201, 203 in the time stamp queue 221 includes a submission time 212 in which the frame is inserted into the timestamp queue 221, frame information 214 that includes data that the display sub-system 117 is to use to display a frame. In one embodiment, the frame information 214 for an entry 201, 203 includes context and state information for the display sub-system 117 to use to display the frame. The frame information 214 can additionally include one or more memory addresses for surfaces to display as part of the frame. In one embodiment the frame information 214 includes a requested presentation time for the frame.

An entry 201, 203 can additionally include and one or more hint(s) 216 to the display sub-system, which can be provided to the performance controller 118 to configure performance parameters for the display sub-system 117 and/or graphics sub-system 116. In one embodiment, the hint(s) 216 can include an indication as to the complexity of the frame to be displayed, such as a number of surfaces to be composited and/or an indication as to a complexity of a blend operation to be performed. In one embodiment the hint(s) 216 can include an indication of a graphical complexity of an upcoming scene, such as an indication that a scene includes a larger number of and/or a complex set of shader operations to be performed by the graphics sub-system 116. Such hint(s) 216 can be provided by the performance controller 118 to enable proactive adjustment of performance related parameters for the graphics sub-system 116 and/or display sub-system 117 based on upcoming workloads. In one embodiment, the real time processor (RTP 120) can cyclically scan the set of entries in the timestamp queue 221 to read hint(s) 216 from the entries 201, 203 and provide hint related information to the performance controller 118.

Figure 3:
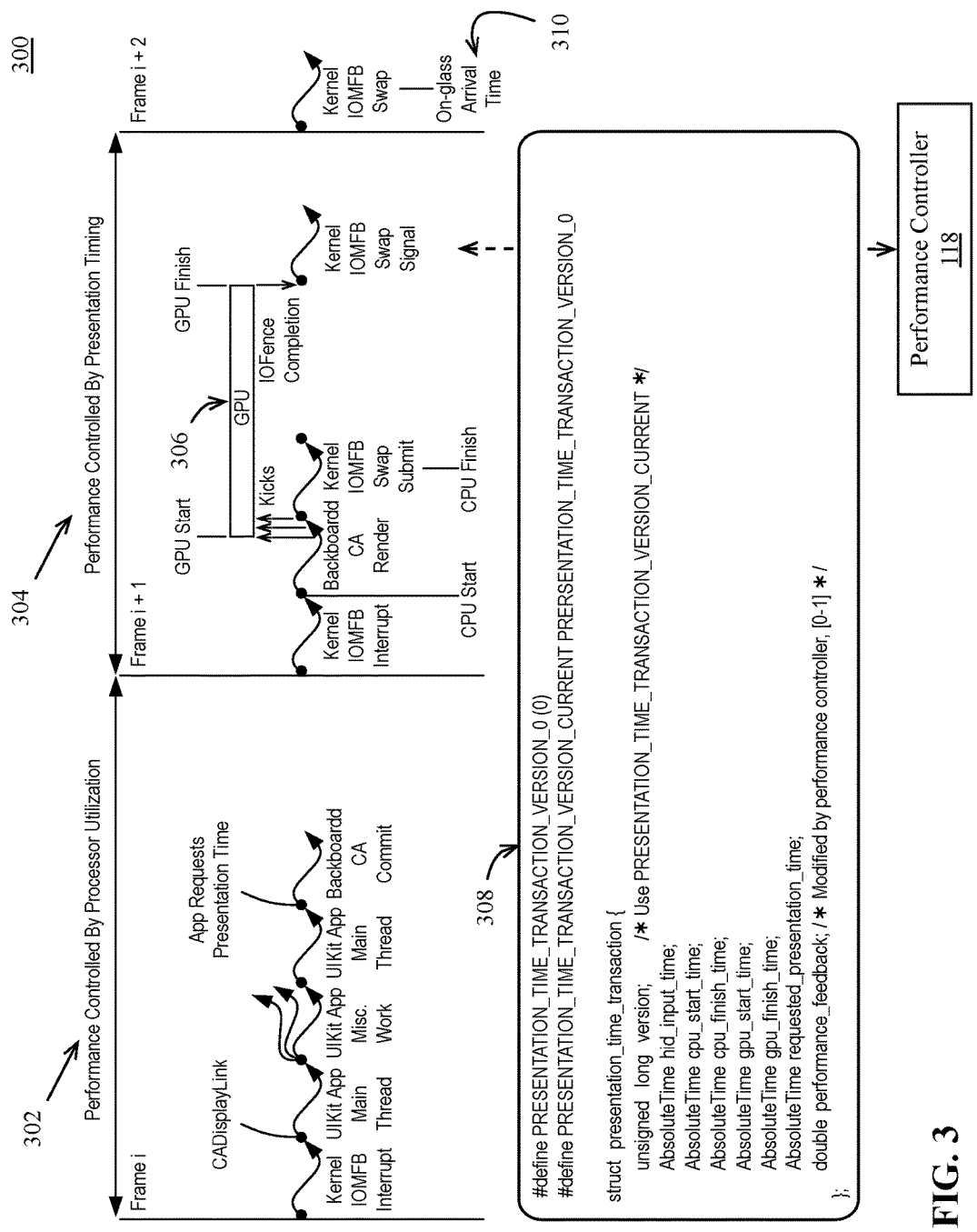
FIG. 3 is an illustration of graphics and display performance control and feedback system 300, according to an embodiment.

FIG. 3 is an illustration of graphics and display performance control and feedback system 300, according to an embodiment. In one embodiment display system performance can be controlled by processor utilization 302 or performance can be controlled by presentation timing 304. In one embodiment, an application can generate a first frame (Frame i) in which performance is controlled by processor utilization (302). A kernel IO mobile framebuffer interrupt can be received via a CADisplayLink object that enables an application to synchronize drawing operations to the refresh rate of the display. The application may be an application that interfaces with a UI framework (e.g., UIkit) to perform user interface operations. One or more threads of the application can perform operations to generate frame content for display and the content for Frame i can be presented to a display device for immediate display.

In one embodiment, subsequent frames (e.g., Frame i+1) can be generated and displayed based on a pre-determined presentation timing. A thread operating on a processor (e.g., CPU) can begin operations to prepare the frame for rendering. A CPU start and end time can be tracked during frame preparation. During CPU operation for a frame, the CPU can kick rendering operations to a graphics processing unit (GPU 306) and submit a swap operation for the frame to the display engine. When the GPU completes rendering operations, the display engine can swap the finished frame with a previously displayed frame.

Statistics associated with the rendering of each frame can be maintained by the graphics and display performance control and feedback system 300. In one embodiment, a presentation time transaction data structure 308 can be maintained, which is used to report presentation time information. Exemplary presentation time transaction information includes a human interface device input time (hid_input_time) associated with a frame, a CPU start time (cpu_start_time) and CPU finish time (cpu_finish_time) associated with a frame, as well as a GPU start time (gpu_start_time) and GPU finish time (gpu_finish_time). In one embodiment a requested presentation time (requested_presentation_time) for the frame. In one embodiment the presentation time transaction data structure 308 can also include performance feedback data (performance_feedback), which may be modified by the performance controller 118. In one embodiment, an "on glass arrival time" 310 for each frame is also tracked, which is the time in which a given frame is actually displayed on a display device associated with the display sub-system. In one embodiment, the set of presentation time statistics can be provided to clients of the display sub-system, such as the window server 114, UI framework 112, 3D app 108, and/or video app 110 as in FIG. 1. In one embodiment, the presentation time statistics can be used by the clients to adjust rendering operations performed by the clients. In one embodiment the presentation time statistics can also be used by the performance controller 118 to determine if performance parameters for the system should be adjusted.

Per-Frame Control of Presentation Time

Figure 4:
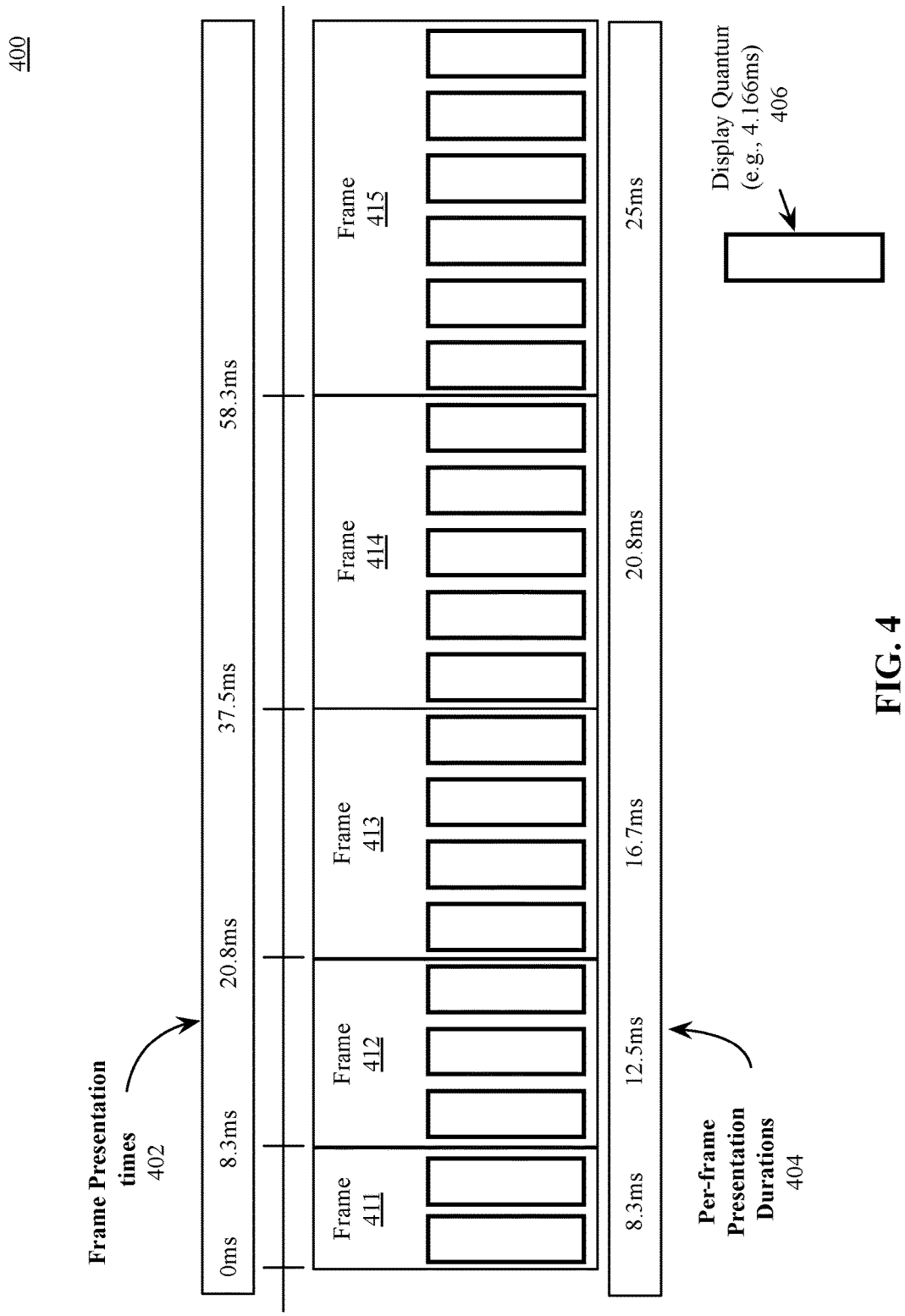
FIG. 4 is an illustration of a system for per-frame control of presentation time, according to an embodiment.

FIG. 4 is an illustration of a system 400 for per-frame control of presentation time, according to an embodiment. In one embodiment, the system 400 for per-frame control of frame presentation times 402 can enable variable per-frame presentation durations 404 for a set of frames, in which the display duration for each frame can be determined at least in part based on the requested presentation time of the successive frame. Each frame can have different presentation durations. For example, frame 411 can be presented at 0 ms and can be presented for 8.3 ms. At 8.3 ms, frame 412 can be presented for 12.5 ms. At 20.8 ms, frame 413 can be presented for 16.7 ms. At 37.5 ms, frame 414 can be presented for 20.8 s until frame 415 is presented. Frame 415 can be presented for 25 ms.

The duration of each frame can be defined based on a one or more display quanta (e.g., display quantum 406). The duration of the display quantum 406 can be defined based on a display event review cycle of a display sub-system (e.g., display sub-system 117 of FIG. 1 and FIG. 2). During each display quantum 406, the display sub-system can review a set of pending display events defined by entries in a timestamp queue (e.g., entry 201, 203 of timestamp queue 221 of FIG. 2). For example, the display subsystem, in one embodiment, via a real time processor (e.g., RTP 120 of FIG. 1 and FIG. 2) can operate at a display event review rate of 240 Hz, defining a display quantum 4.166 ms. During each review cycle, the display sub-system can determine whether a new frame is to be displayed based on a requested display time for the frame. In one embodiment, when a new frame is not scheduled to be display, the display sub-system can consult an electrical model of the display device to determine whether a currently displayed frame should be automatically refreshed. The automatic refresh can be performed without requiring the intervention of the software logic of the display sub-system software, and is configured to not interfere with display sub-system frame scheduling.

In one embodiment the display sub-system can specify a duration in which frame data is to be displayed and the display subsystem will display the frame data on the display during the display quantum 406 in which the frame is to be displayed, assuming the frame is ready for display. The display sub-system can then either refresh or not refresh the display device at each display quantum 406 based on the electrical properties of the display, rather than a pre-defined refresh rate. Thus, in one embodiment, the refresh rate of the display is at least in part independent from the frame rate of the content displayed on the display, such that display sub-system can program the display to be updated with new content at a controlled frame rate while the display device is independently and automatically refreshed. In one embodiment the automatic refresh of a frame occurs only when necessary, for example, while displaying a long duration frame and the electrical model indicates that flicker will occur if the display device is not refreshed.

Per-Frame Statistics

Figure 5:
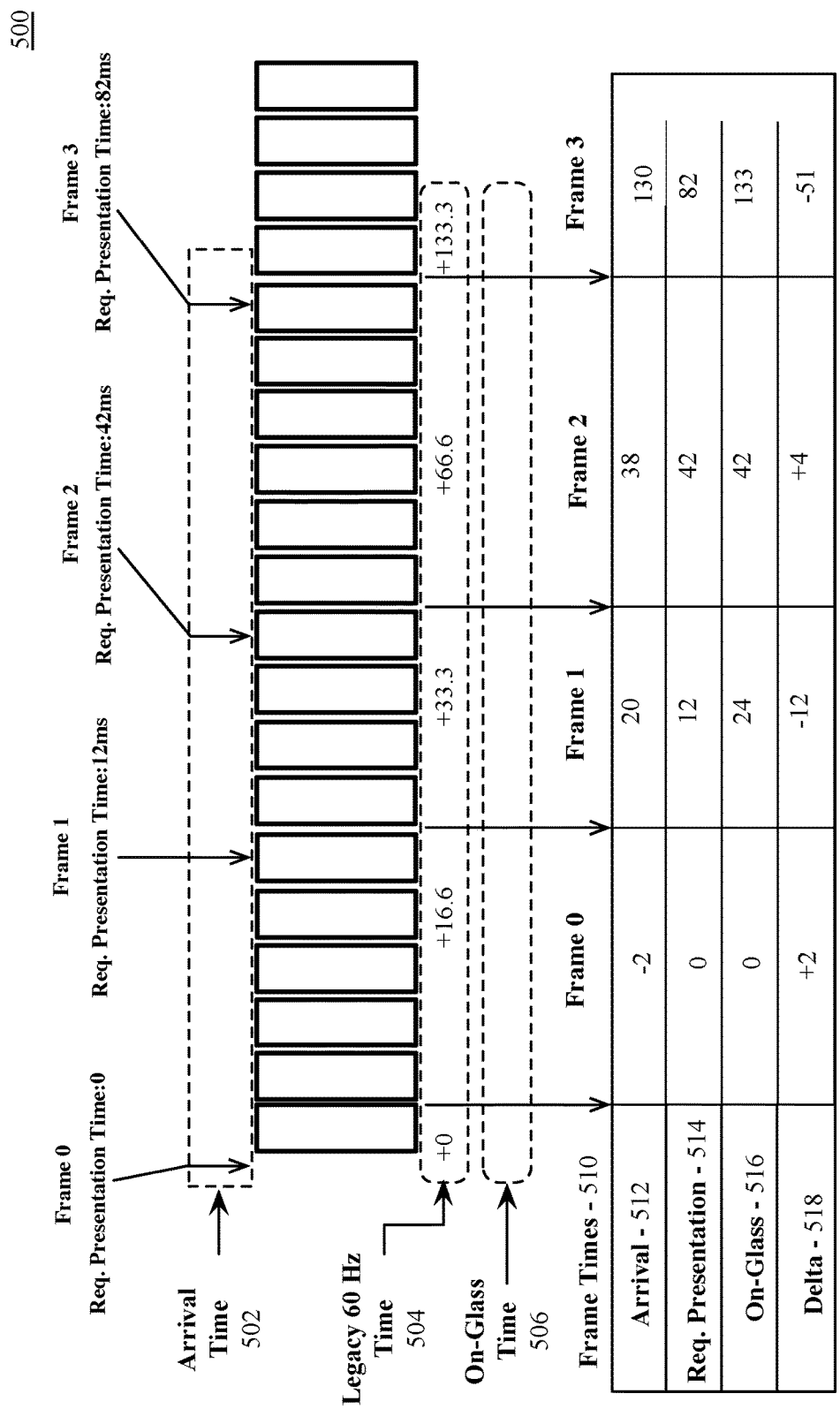
FIG. 5 is an illustration of a system of per-frame statistics, according to an embodiment.

FIG. 5 is an illustration of a system 500 of per-frame statistics, according to an embodiment. The system 500 of per-frame statistics can maintain a set of statistics for each frame, for example, using a data structure similar to the presentation time transaction data structure 308 of FIG. 3. Data such as requested presentation times 502 in which a frame is to be displayed, on-glass times 504 in which the frame data is actually displayed, and identifier data for each of the frame 506. Additionally, 60 Hz display times 508 are illustrated for comparison. Using such data, frame statistics (e.g., frame stats 510) can be maintained for each frame, including times of arrival 512, requested presentation 514, and on-glass 516, as well as delta 518 statistics for the frame. The time of arrival 512, in one embodiment, is the time in which a frame is inserted into the timestamp queue (e.g., timestamp queue 221 of FIG. 2). The requested presentation 514 is the time at which the frame is requested to be presented on the display device. The one-glass 516 time for a frame is the time in which the frame is actually displayed on a display device.

The delta 518 statistics reported for a frame differ depending on whether the time of arrival 512 for the frame is before or after the requested presentation 514 time. If the time of arrival 512 is before the requested presentation 514 time, in one embodiment, the display sub-system can honor the requested presentation time, such that the requested presentation time and the actual presentation (e.g., on-glass) time will be substantially similar. Thus, the delta 518 statistic for the frame can be recorded as the number of milliseconds in which the frame was early. If the frame arrives late to the timestamp queue, the delta 518 statistic can be the difference between the requested presentation 514 time and the on-glass 516 time, which indicates the difference between when the frame is displayed and when the frame was requested to be displayed.

In embodiment described herein, client applications of a window server (e.g., window server 114 of FIG. 1), can generate images to be composited or animated. Additionally, client applications can provide finished frames to the window server to be displayed on the display device. Client applications can generate finished frames via a video decoding API or a 3D rendering API known in the art. A display request submitted by a client application can include a requested presentation time that the display system will attempt to honor. Video decoders can set a presentation time for a frame based on the content's presentation time (e.g., encoded frame rate). 3D graphics APIs or other graphics rendering APIs can set a requested presentation time for each frame based on a determined animation rate for the content. An application can request a legacy presentation time based on a default refresh rate or can specify a specific future timestamp in which a frame will be displayed.

After generating a current frame for display, a client application can then generate several additional frames to be displayed at a specified future time based on the determined animation rate. For example, after generating a finalized frame based on scene data such as 3D geometry data, the client can analyze the position, velocity, acceleration, and other object parameters to advance the scene a number of milliseconds into the future to generate new object data for a future frame, for example, using a physics engine (e.g., phys 208 of FIG. 2). This future frame can then be inserted into a window server queue with a requested display time in the future, before being provided to a display sub-system timestamp queue (e.g., timestamp queue 221) The generation of future frames for display at a predetermined time differs from legacy implementations which perform frame animation at a fixed rate.

If the graphics and display system is operating at a sufficient performance level, the requested presentation times will be honored. In one embodiment, the display request for a frame may be submitted before the graphics processor has completed rendering the frame. If the contents of frame are too complex to be completed by the GPU before the requested presentation time, the presentation of the frame may be delayed. For composite frames, the composition surfaces may be completed by the graphics processor in sufficient time, but the duration of the display engine composition process may cause presentation of a frame to be delayed. In such scenario, statistics maintained for each frame can be provided as feedback to software components of the graphics and display system, which can reduce the complexity or animation rates of successive frames.

For example, if an application or framework is consistently late, animation parameters can be changed to render images for display at larger interval or reduce the scene complexity in each frame. If the application or framework is consistently early, an animation interval may be shorted to enable higher temporal visual quality. In one embodiment, the applications can be configured such that the applications naturally react to display feedback and reduce the frequency of display updates when the display system or electronic device is under duress, such as during period of high processing load, high thermal load, or low battery energy conditions.

For the exemplary frames of FIG. 5, statistics can be gathered as follows. Frame 0 can arrive at the timestamp queue at −2 ms, which, for example, indicates that the frame arrives 2 ms before a timestamp queue review cycle. Frame 0 can request a presentation time of 0 ms, which in one embodiment indicates a request for a legacy presentation time on the next 60 Hz boundary. Frame 0 can be displayed on the next 60 Hz boundary (at 0 ms). Thus, frame stats 510 for Frame 0 can be recorded as −2 ms arrival 512, 0 ms requested presentation 514 and on-glass 516 times, and a +2 ms delta 518.

Frame stats 510 for Frame 1 can be recorded as 20 ms arrival 512, 12 ms requested presentation 514 time, 24 ms on-glass 516 times, and a −12 ms delta 518. The −12 ms delta is recorded because Frame 1 was late to the timestamp queue, causing a 12 ms difference between requested and actual display times. A frame can arrive late to the timestamp queue if the graphical complexity of the frame is such that the GPU and/or CPU cannot complete the frame in time to meet the requested display time for the frame. This can indicate that either the CPU and/or GPU should be stepped up to a higher level of performance by the performance controller. If the performance level of the CPU and/or GPU cannot be increased, for example, due to thermal or energy limits imposed on the system, late frames can indicate that the animation frame rate or graphical complexity of the frames should be reduced.

Frame stats 510 for Frame 2 can be recorded as 38 ms arrival 512, 42 ms requested presentation 514 and on-glass 516 times, with a +4 ms delta 518. Either due to reduced complexity relative to frame 1, or a reduced animation rate, Frame 2 arrived 4 ms before its requested presentation time, allowing the requested presentation time to be honored by the graphics display and display system. Frame 2 is displayed for approximately 91 ms, during which the display device can be automatically and adaptively refreshed as necessary based on the contents of Frame 2 and the electrical properties of the display.

Frame stats 510 for Frame 3 can be recorded as 130 ms arrival 512, 82 ms requested presentation 514 time, 133 ms on-glass 516 times, and a −51 ms delta 518. The −51 ms delta is recorded because Frame 1 was late to the timestamp queue, causing a 51 ms difference between requested and actual display times. In one embodiment, a large difference between a requested presentation time for a frame and the arrival time of a frame in the timestamp queue can indicate that the content of the frame is significantly more complex than can be smoothly displayed at the current performance level of the graphics and display system. Additionally, such large difference may be the result of the performance controller for the system reducing the performance level of the system due to recent high levels of energy consumption, which can cause rendered frames to be late and trigger a reduction in frame complexity at the software level, further reducing system energy consumption.

Variable Frame Rate Animation

The graphics and display system provided by embodiments described herein can be configured to enable variable frame rate animation within applications. An application can present a sequence of frames having an animation frame rate that varies based on the content displayed. Based on the variable animation frame rate of the content, the display device can have a variable refresh rate that is based on the animation frame rate provided by the application.

Figure 6:
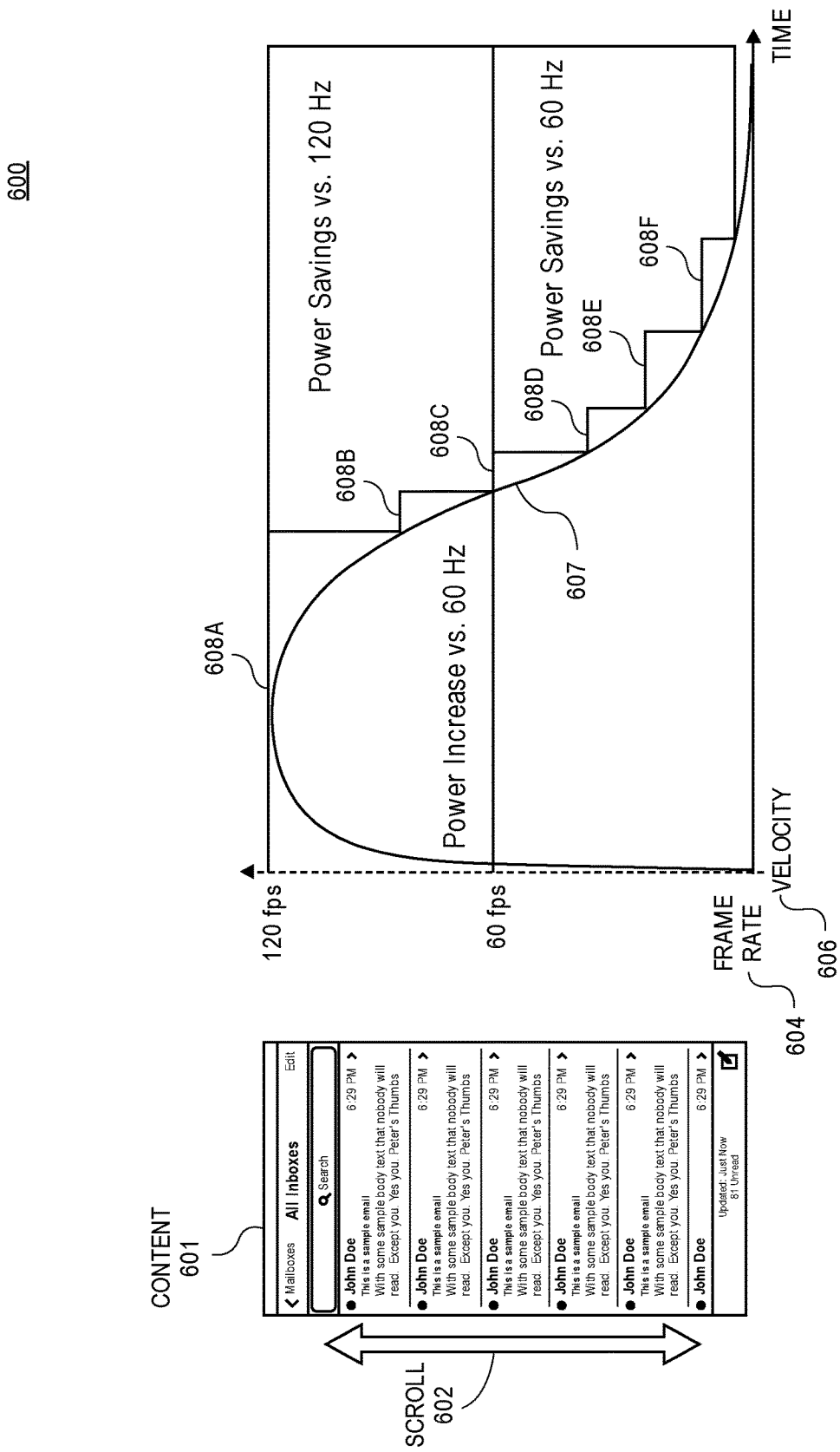
FIG. 6 is an illustration of variable frame rate animation, according to an embodiment.

FIG. 6 is an illustration of variable frame rate animation 600, according to an embodiment. In one embodiment an application, such as an e-mail application, can provide content 601 for display. The application can perform a scroll 602 operation for the displayed content 601 based on input (e.g., touchpad, touchscreen, scroll wheel, etc.) received from a graphical interface. In response to an initial input to scroll the displayed data, the application can generate a sequence of successive frames at a variable animation frame rate 604 based on the velocity 606 or intensity of the initial scrolling input. In one embodiment display logic can compute an animation rate curve 607 for the scroll 602 operation based on animation logic. The animation rate curve 607 can then be quantized to specific frame rates 608A-F at which animation frames for the scroll operation can be generated.

For a fast initial input, such as a fast touch or scroll gesture, the application can generate a sequence of frames having a high initial animation frame rate 604 (e.g., frame rate 608A, frame rate 608B, frame rate 608C). The animation frame rate 604 can be slowed over time (e.g., frame rate 608D, frame rate 608E, frame rate 608F), for example in response to a fade of the initial input, which can reduce the amount of power consumed by the display system due to the reduction in the rate at which frames are generated and displayed.

The display device can be refreshed at refresh rate matching the application animation frame rate to increase the clarity of the sequence of frames. In other words, instead of animating frames based on the frame rate of the display, the display is refreshed based on the animation rate of the content. Accordingly, an initially high animation rate can result in an initially high display refresh rate (e.g., 120 Hz), which results in an increase in display power consumption relative to a 60 Hz refresh rate, but produces enhanced visual quality output relative to 60 Hz. The initially high animation rate can be reduced over time, resulting in power savings relative to 120 Hz (e.g., frame rates 608B-608C), then power savings relative to 60 Hz (e.g., frame rates 608D-608F).

While FIG. 6 provides scrolling as an example of variable frame rate animation, animation rate curves can be determined for other display animations, such as animations associated with application launch and suspend, device unlock, home screen scrolling, and pushing and popping display views. Adaptive refresh can be performed for each of these animations, such that the refresh rate of the display conforms to the animation rate for the frames generated for the animation. FIG. 7-10 illustrate additional animation/refresh rate curves for exemplary operations.

Figure 7:
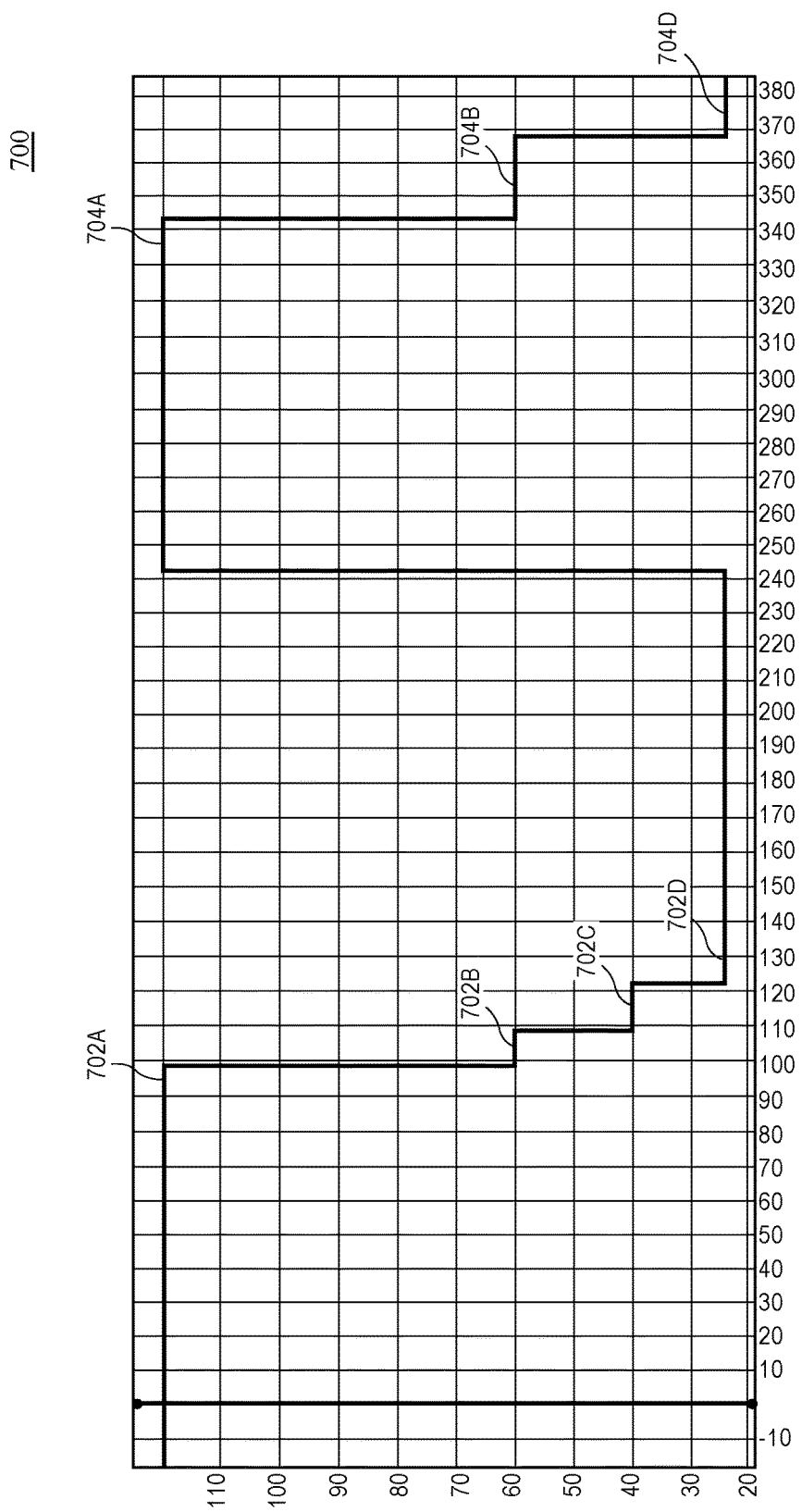
FIG. 7 illustrates variable frame rate animation for a launch and suspend operation on an electronic device.

FIG. 7 illustrates variable frame rate animation 700 for a launch and suspend operation on an electronic device. The animation for launch and suspend includes a launch portion in which an animation for an application launch is displayed and a suspend portion in which an animation for application suspend is displayed. During the launch animation, a first set of frames can be generated at a first animation rate 702A, such as 120 Hz. The animation can begin at an initially high frame rate relative to successive frames due to the nature of the animation displayed, such that higher frame rates during the initial period of the launch animation provides improved visual impact and/or visual quality relative to animations at a lower frame rate.

After a period of time at the first animation rate 702A, the animation rate can be reduced to a second animation rate 702B that is significantly lower than the first animation rate (e.g., 60 Hz). In one embodiment the animation rate of the launch animation can be more quickly stepped down to a third animation rate 702C (e.g., 40 Hz) and a fourth animation rate (e.g., 24 Hz). The display system, for each animation rate 702A-702D, can base a requested refresh rate for the display on the animation rates for the content.

In one embodiment, animation rates for a suspend animation can be defined similarly, with a high initial animation/frame rate 704A followed by a tapering of the frame rate to a second animation rate 704C and a third animation rate 704D.

Figure 8:
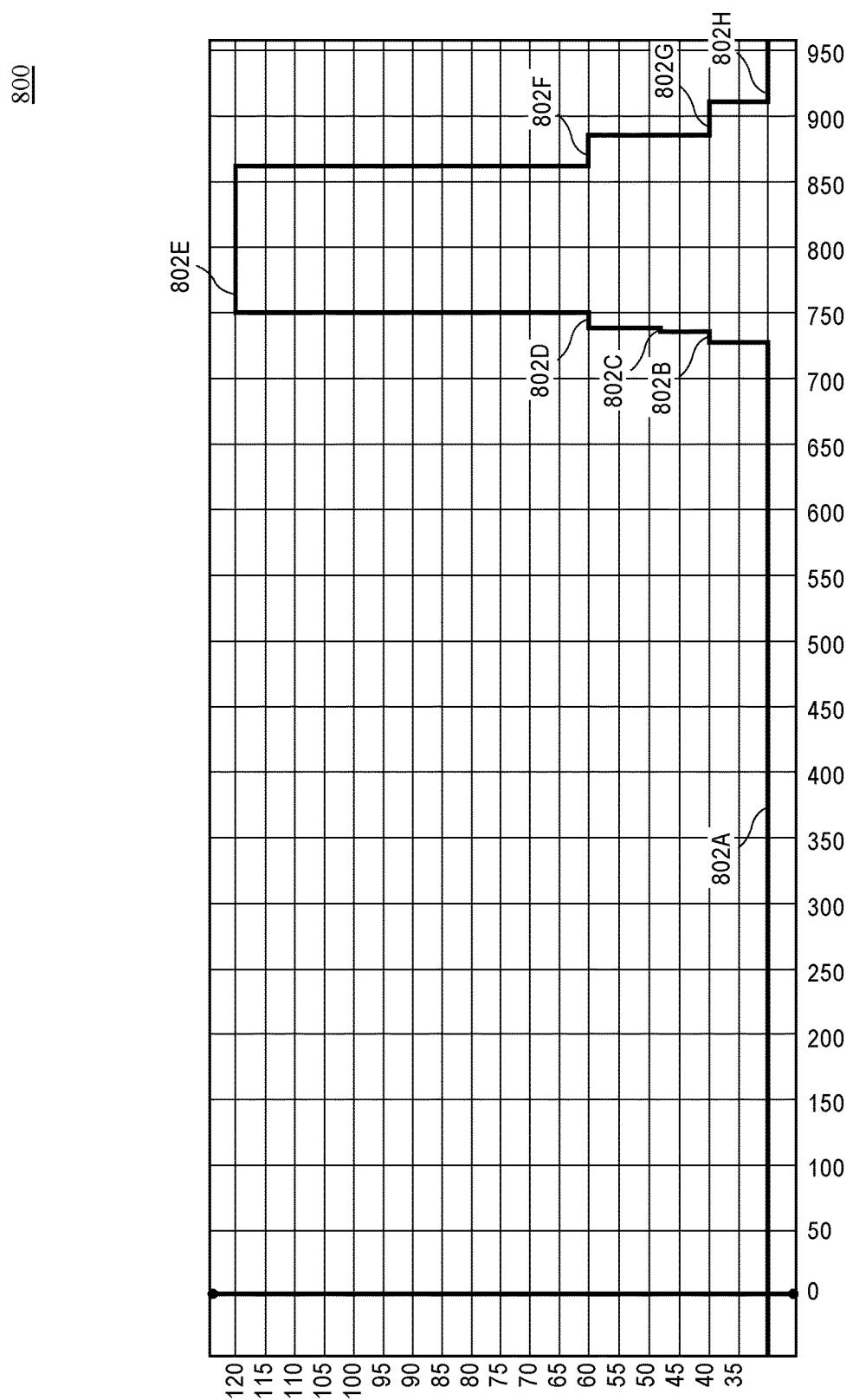
FIG. 8 illustrates variable frame rate animation for an unlock animation on an electronic device.

FIG. 8 illustrates variable frame rate animation 800 for an unlock animation on an electronic device. The unlock animation can be display during, or in response to an input, for example, a touch screen input, to transition the electronic device from a locked to an unlocked state. The animation can begin at first animation rate 802A, which is a low animation frame rate relative to successive frame rates. A frame rate ramp can occur in which successively higher animation rates (animation rate 802B, animation rate 802C, animation rate 802D) are stepped through until a maximum animation rate 802E (e.g., 120 Hz) is reached. The maximum animation rate 802E can be maintained for a period of time before an animation rate taper occurs, where the animation rate is successively reduced (animation rate 802F, animation rate 802G, animation rate 802H).

In general, variable frame rate animation provided by embodiments can be classified into multiple stages. First, an initial frame rate ramp occurs, which may be immediate as in the launch and suspend animation of FIG. 7, or more gradual as with the unlock animation of FIG. 8. Second, a high animation rate is maintained for a period. Third, the high animation rate is tapered to a lower animation rate. By following such refresh rate patterns, embodiments can approach the visual quality of a high sustained animation rate while realizing display system power savings, for example, as illustrated in FIG. 6. The multi-stage frame rate control can be applied to various animations in addition to those illustrated herein, such as a home screen scrolling and pushing and popping user interface views. In each instance, the refresh rate of a display can be synchronized with the animation rates, such that the display is rapidly refreshed during periods of fast animation and slowly refreshed during periods of slow animation.

In one embodiment, variable animation rates and animation rate based display refreshing can be used to coalesce the animation and frame rates of multiple applications. For example, one embodiment provides for a tablet computing device in which multiple foreground applications may be displayed simultaneously and each of the multiple foreground applications can display animated content on the screen. Each application can have different animation frame rate and associated presentation times, such that the separate applications are not tied to the same animation rate. However, it may be advantageous to at least partially synchronize the animation rates of the applications.

In one embodiment the display system is configured to attempt to synchronize the applications to a common phase to enable a displaying content for both applications at a lower refresh rate. For example, two applications generating 30 Hz animations can be configured to generate frames at the same time to enable the display device to refresh at 30 Hz. Additionally, the presentation times for the applications can be coalesced such that, if allowed by the application and the frames in question are available for display, the display times for one or more applications may be adjusted to enable the frames of the multiple applications to be presented in the same refresh cycle. However, if the display system is unable to keep the animation frame rates of the applications in phase, the display device can be refreshed at a higher refresh rate (e.g., 60 Hz) to honor the requested presentation times for the applications. As an additional example, if two applications have content animated at 60 Hz and the content cannot be phase aligned, the display device can be refreshed at 120 Hz to honor the requested presentation times for the applications.

Figure 9:
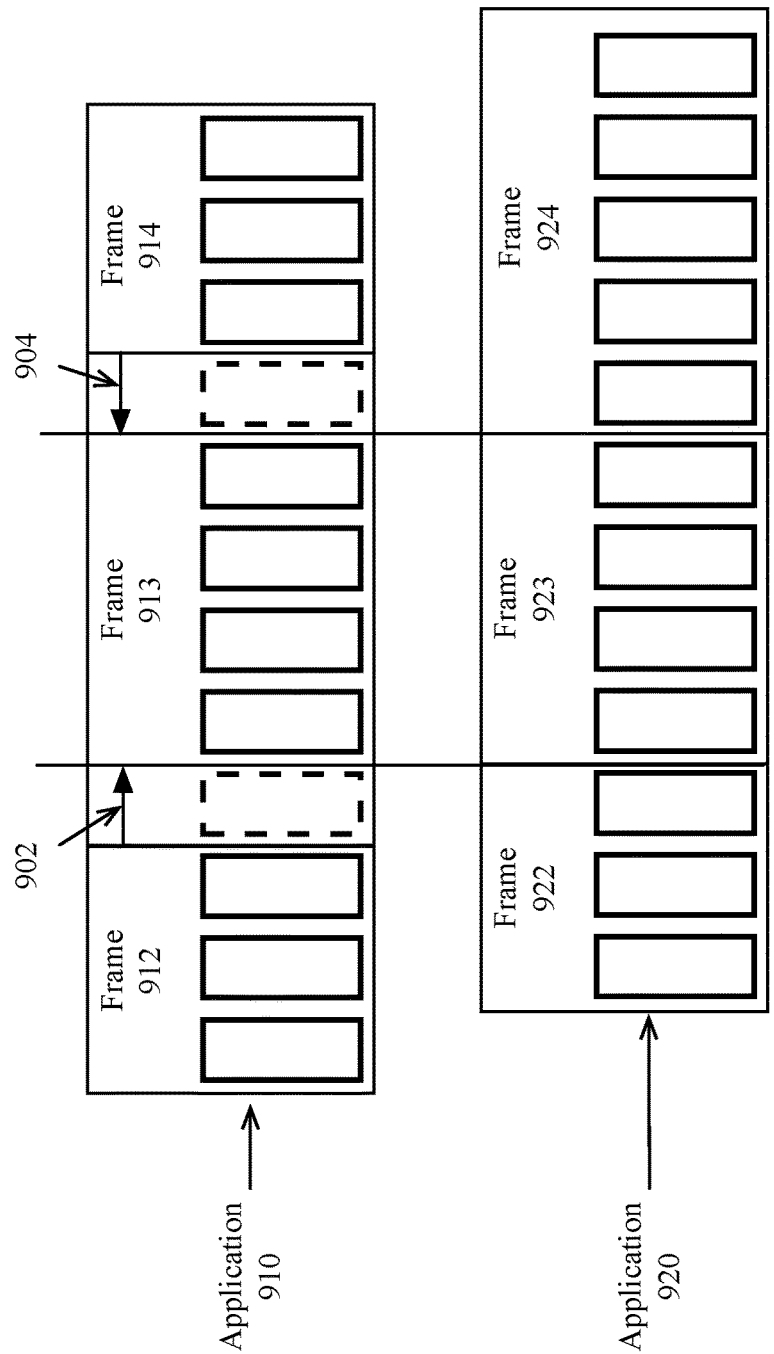
FIG. 9 is an illustration of variable frame rate coalescing, according to an embodiment.

FIG. 9 is an illustration of variable frame rate coalescing 900, according to an embodiment. In one embodiment a first application 910 and a second application 920 can be displayed on a display device, wherein each application renders frames at independent target animation rates. In an exemplary condition in which a frame (e.g., frame 912) of the first application 910 is out of phase with a frame (e.g., frame 922) of the second application 920, the swap time can be adjusted 902 (e.g., delayed) to align the frames, such that, for example, frame 912 and frame 922 are each scheduled to be swapped during the same display quantum, where frame 912 is replaced with frame 913 and frame 922 is replaced with frame 923. In addition to adjusting a requested presentation time of a frame to delay frame presentation, one embodiment provides logic that can advance 904 a scheduled presentation time for frame, such that frame 914 for the first application 910 can be presented during same display quantum as frame 924 of the second application 920.

Figure 10:
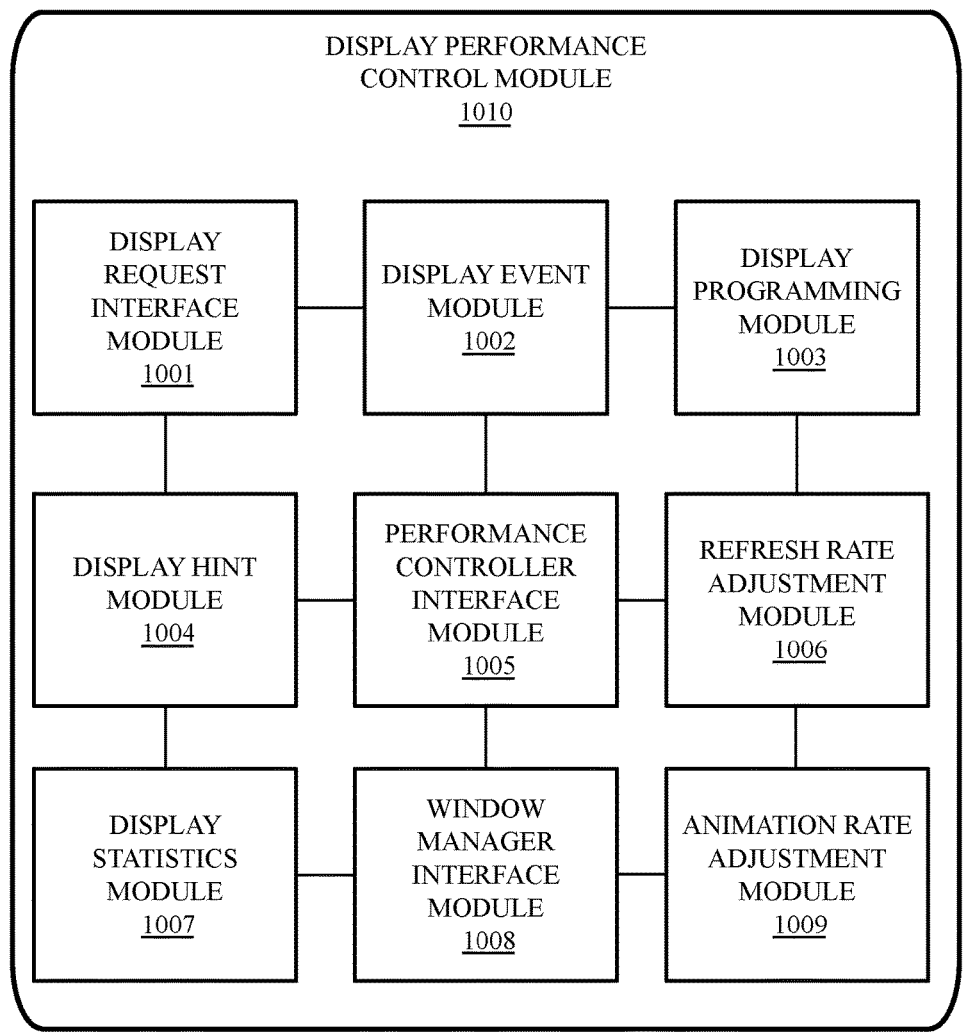
FIG. 10 is a block diagram of a display performance control system, according to an embodiment.

FIG. 10 is a block diagram of a display performance control system 1000, according to an embodiment. The illustrated modules are an exemplary representation of software or hardware logic of the display performance control system 1000. In one embodiment the display performance control system 1000 includes a display performance control module 1010. The display performance control module 1010 can include a display request interface module 1001, a display event module 1002, a display programming module 1003, a display hint module 1004, a performance controller interface module 1005, a refresh rate adjustment module 1006, a display statistics module 1007, and window manager interface module 1008, and/or an animation rate adjustment module 1009. The illustrated modules are an exemplary representation of software or hardware logic of the display performance control system 1000.

In one embodiment the display request interface module 1001 is configured to receive a request to display one or more frames of data. The request can include a requested presentation time in which the one or more frames of data are to be displayed. The one or more frames can be generated by a graphics processor described herein. The display event module 1002 can be configured to generate one or more display events associated with the one or more frames of data. The display programming module 1003 can be configured to program the display engine based on the one or more display events.

In one embodiment, one or more hints can be includes in the generated display events by the display hint module 1004. The display hint module 1004 can provide hints to the display system based on a complexity of current or upcoming frames. In one embodiment the display hint module 1004 can process a first hint includes in a display request and, based on the first hint, include a second hint in the display event. The formats of the first hint and the second hint can be the same or can be different, such that the first hint is inserted into the display event or the second hint can be derived based on the first hint. In one embodiment the second hint within the display event can be provided to a performance controller via a performance controller interface module 1005. The performance controller can be configured to adjust one or more performance related parameters for the display system based on the second hint.

In one embodiment the display performance control system 1000, in response to a display event, can enable the refresh rate adjustment module 1006 to adjust a refresh rate of a display based on a processed display event. The refresh rate adjustment module 1006 can dynamically adjust the refresh rate of the display device based on the content displayed or to be displayed on the display device.

In one embodiment the display performance control system 1000 can configure the display statistics module 1007 to maintain per-frame statistics of frames that are displayed on the display device. The display statistics module 1007 can manage a set of statistics associated with a display request received via the display request interface module 1001. The display statistics module 1007 can be further configured to periodically submit the set of statistics to a window manager of the display system via a window manager interface module 1008. The window manager, after receiving the statistics, can enable an animation rate adjustment module 1009 to adjust an animation rate of animations generated by the window manager or request an animation rate adjustment from client applications of the window manager.

Display Performance Control Logic

FIGS. 11-14 illustrate logic operations to perform the display performance control processes described herein. The illustrated logic operations can be performed by various components of the graphics and display system 100 of FIG. 1 and/or the graphics and display sub-system 200 as in FIG. 2 using the techniques and data structures herein described throughout the present specification.

Figure 11:
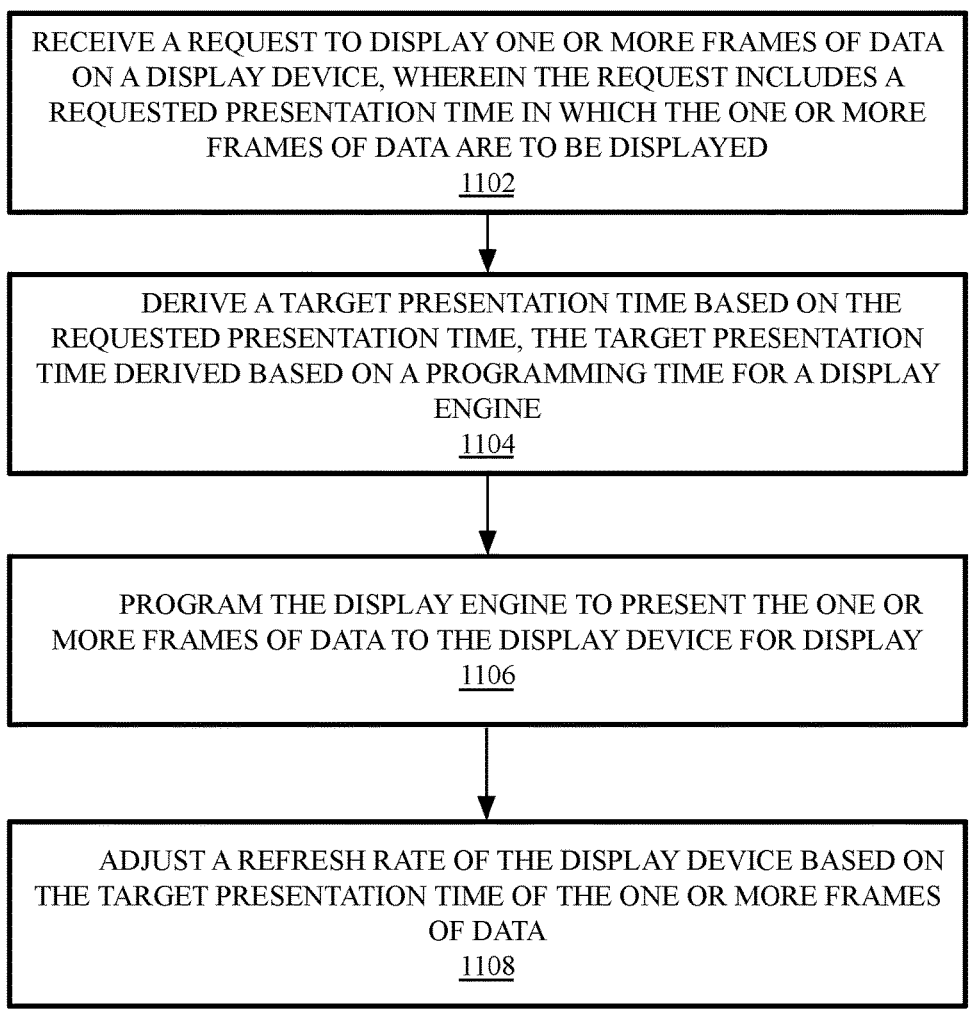
FIG. 11 is a flow diagram illustrating display performance control logic, according to an embodiment.

FIG. 11 is a flow diagram illustrating display performance control logic 1100, according to an embodiment. In one embodiment the display performance control logic 1100 can receive a request to display one or more frames of data on a display device, as shown at 1102. The one or more frames of data can be generated via one or more processors described herein. In one embodiment the request includes a requested presentation time in which the one or more frames of data are to be displayed.

The display performance control logic 1100 can further derive a target presentation time based on the requested presentation time, as shown at 1104. The target presentation time can be derived based on a programming time for a display engine. In other words, the target presentation time is an adjustment of the requested presentation time to account for the amount of time required to program the display engine with the information used to display the frame.

The display performance control logic 1100 can further program the display engine to present the one or more frames of data to the display device for display, as shown at 1106. The display performance control logic 1100 can then cause the display engine to adjust a refresh rate of the display device based on the target presentation time of the one or more frames of data, as shown at 1108.

Figure 12:
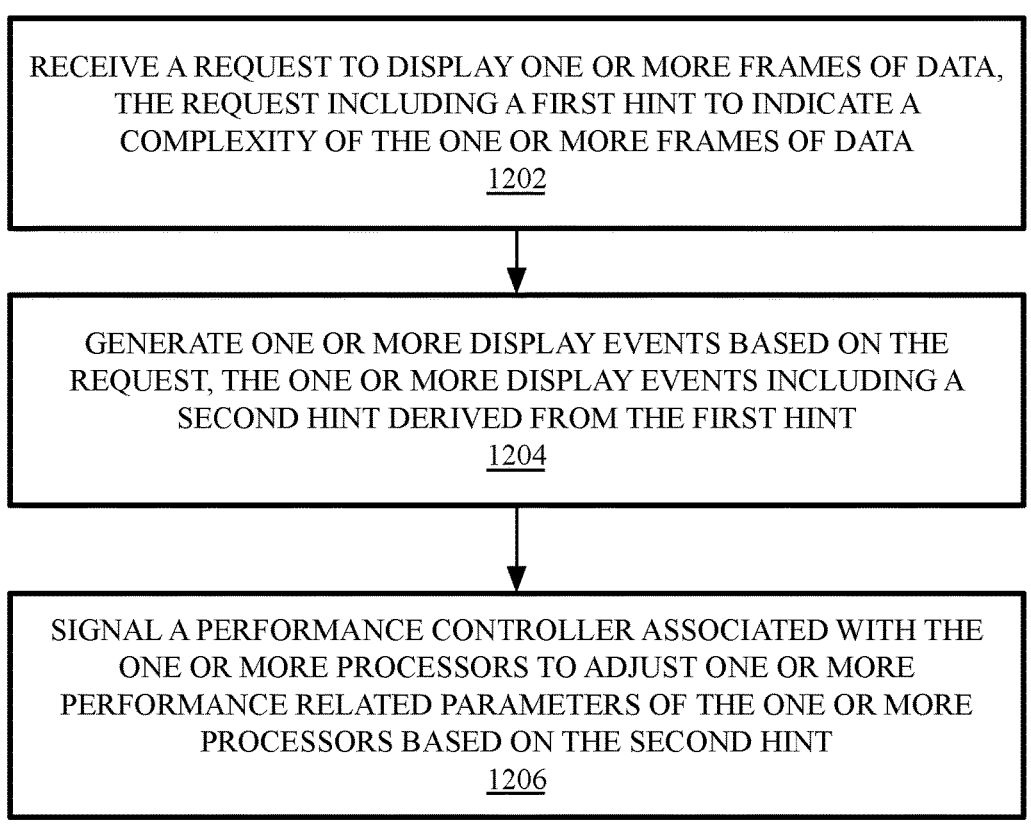
FIG. 12 is a flow diagram illustrating display performance control hint logic, according to an embodiment.

FIG. 12 is a flow diagram illustrating display performance control hint logic 1200, according to an embodiment. The performance control hint logic 1200, in one embodiment, can receive a request to display one or more frames of data, as shown at 1202. The request can include a first hint to indicate a complexity of the one or more frames of data. The performance control hint logic 1200 can then generate one or more display events based on the request, as shown at 1204. The one or more display events can include a second hint that can be derived from the first hint. The performance control hint logic 1200 can then signal a performance controller associated with the one or more processors to adjust one or more performance related parameters of the one or more processors based on the second hint, as shown at 1206.

Figure 13:
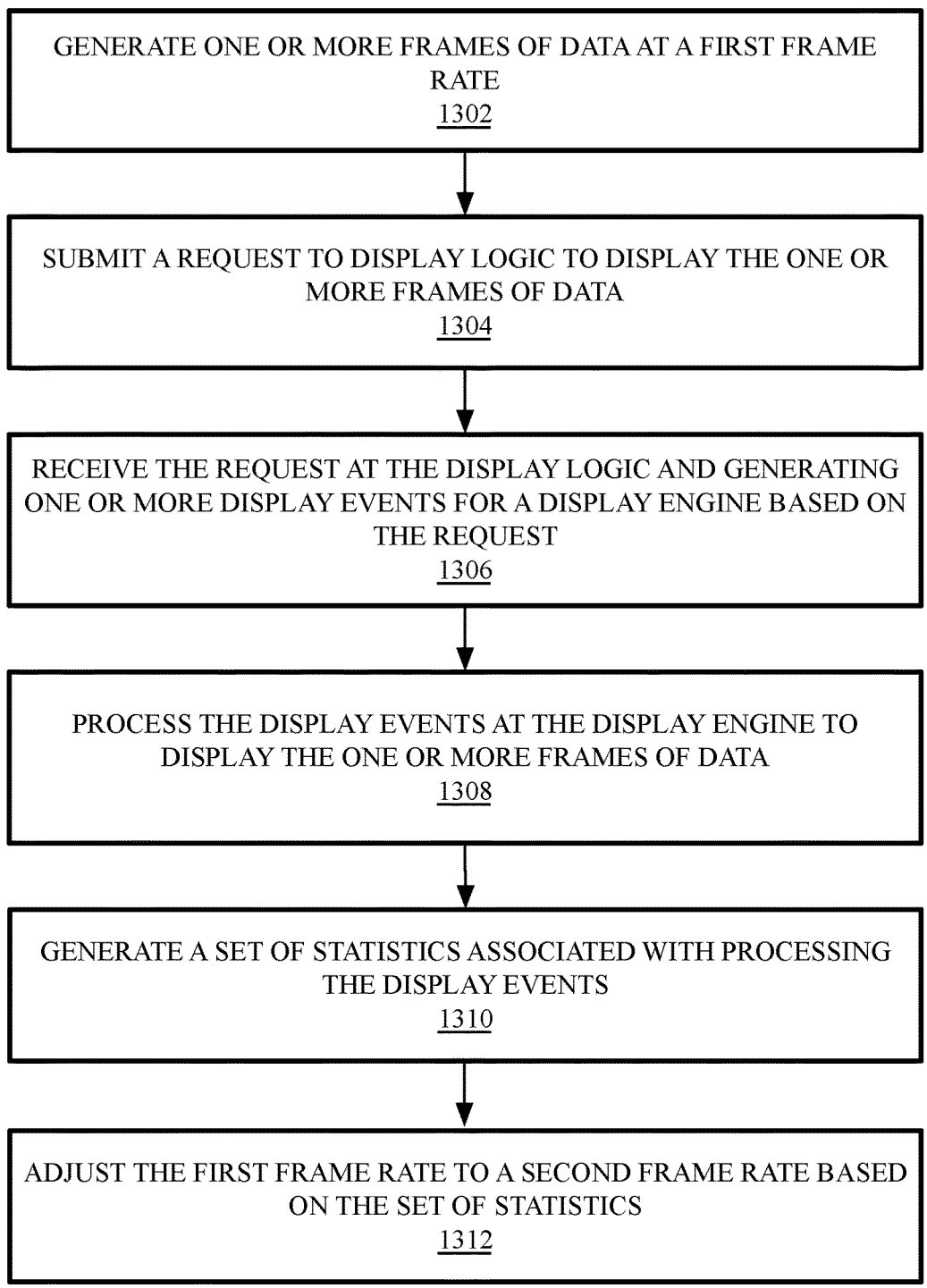
FIG. 13 is a flow diagram illustrating a process of animation frame rate adjustment based on display performance control feedback, according to an embodiment.

FIG. 13 is a flow diagram illustrating a process 1300 of animation frame rate adjustment based on display performance control feedback, according to an embodiment. The illustrated process 1300 of animation frame rate adjustment can be performed based on the generation of one of more frames of data at a first frame rate, as shown at 1302. For example, a graphic application can generate frames for display and request a window manager to submit a request to display logic to display the one or more frames of data, as shown at 1304. Display logic, at 1306, can receive the request and generate one or more display events for a display engine based on the request.

The display engine can process the display events to display the one or more frames of data, as shown at 1308. In one embodiment a real time processor can be configured to provide display events to the display engine. The display events can be provided, for example, in the form of timestamp queue entries (e.g., entry 201, 203 of the timestamp queue 221 of FIG. 2).

In one embodiment, the display engine can generate a set of statistics associated with processing the display events, as shown at 1310. The set of statistics can be used to adjust the first frame rate to a second frame rate based on the set of statistic, as shown at 1312.

Figure 14:
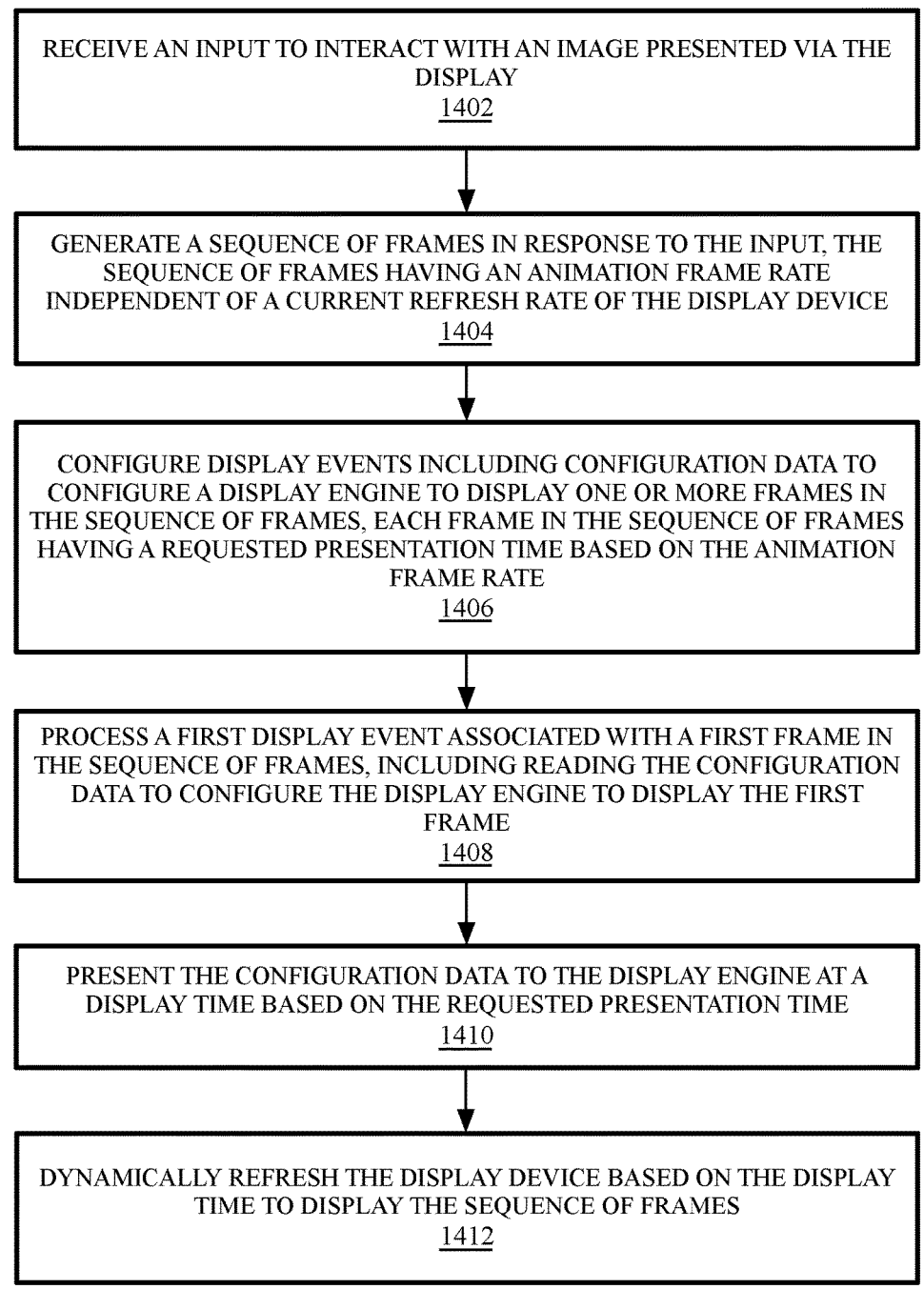
FIG. 14 is a flow diagram illustrating display performance control variable animation rate logic, according to an embodiment.

FIG. 14 is a flow diagram illustrating display performance control variable animation rate logic 1400, according to an embodiment. The display performance control variable animation rate logic 1400 can receive input to interact with an image presented via the display, as shown at 1402. The display performance control variable animation rate logic 1400 can then generate a sequence of frames in response to the input, the sequence of frames having an animation frame rate independent of a current refresh rate of the display device, as shown at 1404. The animation frame rate can be determined based on a parameter associated with the input.

In one embodiment the display performance control variable animation rate logic 1400 can configure display events associated with the sequence of frames, where the display events include configuration data to configure a display engine to display one or more frames in the sequence of frames, as shown at 1406. Each frame in the sequence of frames can have a requested presentation time based on the animation frame rate.

In one embodiment the display performance control variable animation rate logic 1400 can process a first display event associated with a first frame in the sequence of frames, as shown at 1408. In one embodiment processing the first display event includes reading configuration data to configure the display engine to display the first frame.

In one embodiment the display performance control variable animation rate logic 1400 can then present the configuration data to the display engine at a display time based on the requested presentation time, as shown at 1410.

In one embodiment the display performance control variable animation rate logic 1400 can then dynamically refresh the display device based on the display time to display the sequence of frames, as shown at 1412.

Figure 15:
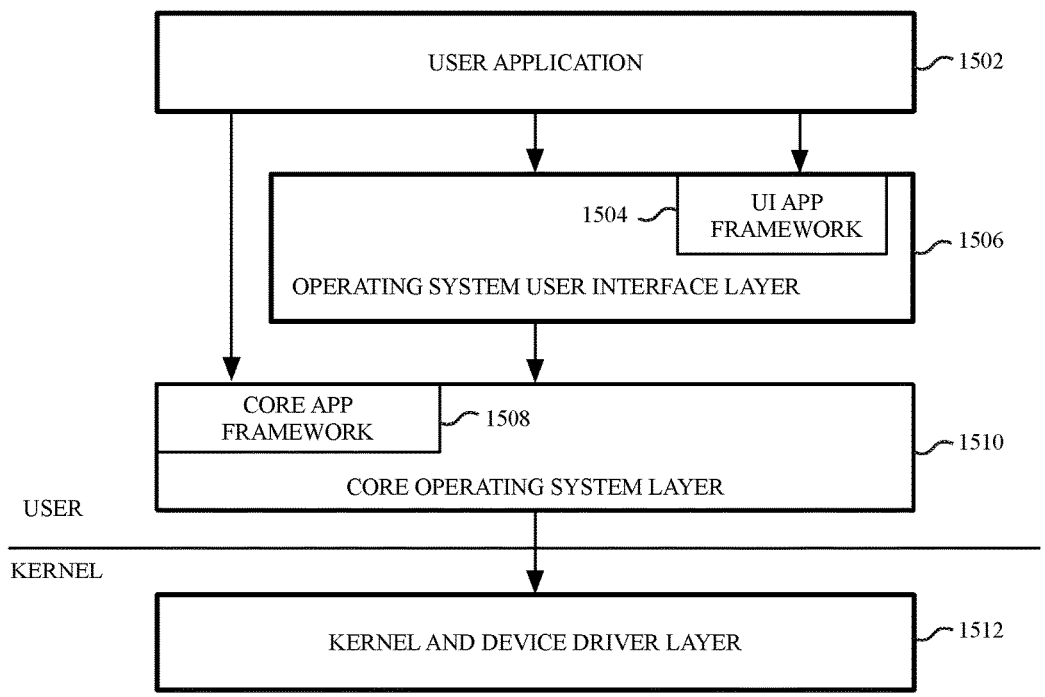
FIG. 15 is a block diagram illustrating a multi-layer software architecture used by a data processing system, according to an embodiment.

FIG. 15 is a block diagram illustrating a multi-layer software architecture 1500 used by a data processing system, according to an embodiment. The software components are illustrated with a division between user space and a kernel space. Although other arrangements are possible, user applications (e.g., user application 1502), and some operating system components (e.g., operating system user interface layer 1506, and the core operating system layer 1510) execute in user space. In kernel space, the operating system kernel and a set of device drivers operate in the kernel and device driver layer 1512. The kernel and device driver layer 1512 manage the underlying functionality of the overall operating system and provide a formalized and secure mechanism for user space software to access data processing system hardware.

A user interface (UI) application framework 1504 provides a mechanism for the user application 1502 to access UI services provided by the operating system (OS) UI layer 1506. Underlying operating system functions that are not related to the user interface can be performed in the core operating system layer 1510. One or more data management frameworks, such as a core app framework 1508 can be made available to a user application to facilitate access to operating system functions.

The user application 1502 is exemplary and may be any one of a plurality of user applications. Each user application 1502 can include one or more processes or tasks, which may spawn multiple threads. The user application 1502 can access instructions in an exemplary UI app framework 1504 for creating and drawing graphical user interface objects such as icons, buttons, windows, dialogs, controls, menus, and other user interface elements. The UI application framework 1504 also provides additional functionality including menu management, window management, and document management, as well as file open and save dialogs, drag-and-drop, and copy-and-paste handling.

The core operating system layer 1510 contains operating system components that implement features including and related to application security, system configuration, graphics and media hardware acceleration, and directory services. Multiple application frameworks, including the core app framework 1508, provide a set of APIs to enable a user application 1502 to access core services that are essential to the application, but are not directly related to the user interface of the application. The core app framework 1508 can facilitate an application's access to database services, credential and security services, backup services, data synchronization services, and other underlying functionality that may be useful to an application.

The core app framework 1508, or equivalent application frameworks, can provide access to remote server based storage for functionality including synchronized document storage, key-value storage, and database services. Key-value storage allows a user application 1502 to share small amounts of data such as user preferences or bookmarks among multiple instances of the user application 1502 across multiple client devices. The user application 1502 can also access server-based, multi-device database solutions via the core app framework 1508.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 16:
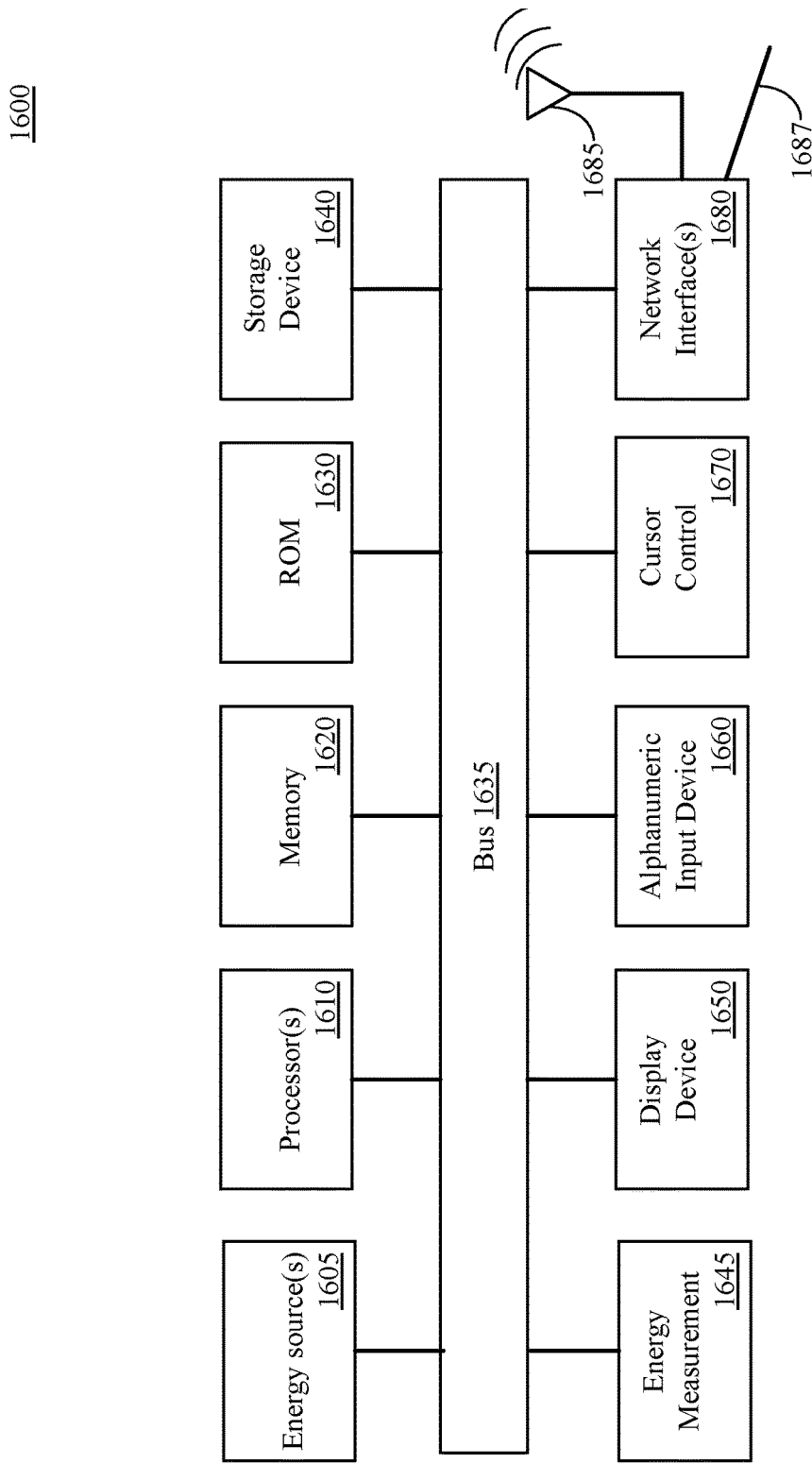
FIG. 16 is a block diagram of one embodiment of a computing system.

FIG. 16 is a block diagram of one embodiment of a computing system 1600. The computing system illustrated in FIG. 16 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 16 may be used to provide the computing device and/or the server device.

Computing system 1600 includes bus 1635 or other communication device to communicate information, and one or more processor(s) 1610 coupled to bus 1635 that may process information. While computing system 1600 is illustrated with a single processor, computing system 1600 may include multiple processor(s) 1610, including one or more co-processors. Computing system 1600 further may include memory 1620, which may be random access memory (RAM) or another randomly accessible storage device, coupled to bus 1635 and may store information and instructions that may be executed by processor(s) 1610. Memory 1620 may also be used to store temporary variables or other intermediate information during execution of instructions by processor(s) 1610.

Computing system 1600 may also include read only memory (ROM) 1630 and/or another data storage device 1640 coupled to bus 1635 that may store information and instructions for processor(s) 1610. Data storage device 1640 may be coupled to bus 1635 to store information and instructions. Data storage device 1640 such as flash memory or a magnetic disk or optical disc and corresponding drive may be coupled to computing system 1600.

Computing system 1600 may also be coupled via bus 1635 to display device 1650, such as a cathode ray tube (CRT), a liquid crystal display (LCD), or a light emitting diode (LED) display, to display information to a user. Computing system 1600 can also include an alphanumeric input device 1660, including alphanumeric and other keys, which may be coupled to bus 1635 to communicate information and command selections to processor(s) 1610. Another type of user input device is cursor control 1670, such as a touchpad, a mouse, a trackball, or cursor direction keys to communicate direction information and command selections to processor(s) 1610 and to control cursor movement on display device 1650. Computing system 1600 may also receive user input from a remote device that is communicatively coupled to computing system 1600 via one or more network interface(s) 1680.

Computing system 1600 further may include one or more network interface(s) 1680 to provide access to a network, such as a local area network. Network interface(s) 1680 may include, for example, a wireless network interface having antenna 1685, which may represent one or more antenna(e). Computing system 1600 can include multiple wireless network interfaces such as a combination of WiFi, Bluetooth®, near field communication (NFC), and/or cellular telephony interfaces. Network interface(s) 1680 may also include, for example, a wired network interface to communicate with remote devices via network cable 1687, which may be, for example, an Ethernet cable, a coaxial cable, a fiber optic cable, a serial cable, or a parallel cable.

In one embodiment, network interface(s) 1680 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1680 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

Computing system 1600 can further include one or more energy sources 1605 and an one or more energy measurement systems 1645. Energy sources 1605 can include an AC/DC adapter coupled to an external power source, one or more batteries, one or more charge storage devices, a USB charger, or other energy source. Energy measurement systems include at least one voltage or amperage measuring device that can measure energy consumed by the computing system 1600 during a predetermined period of time. Additionally, one or more energy measurement systems can be included that measure, e.g., energy consumed by a display device, cooling subsystem, WiFi subsystem, or other frequently-used or high consumption subsystem.

Figure 17:
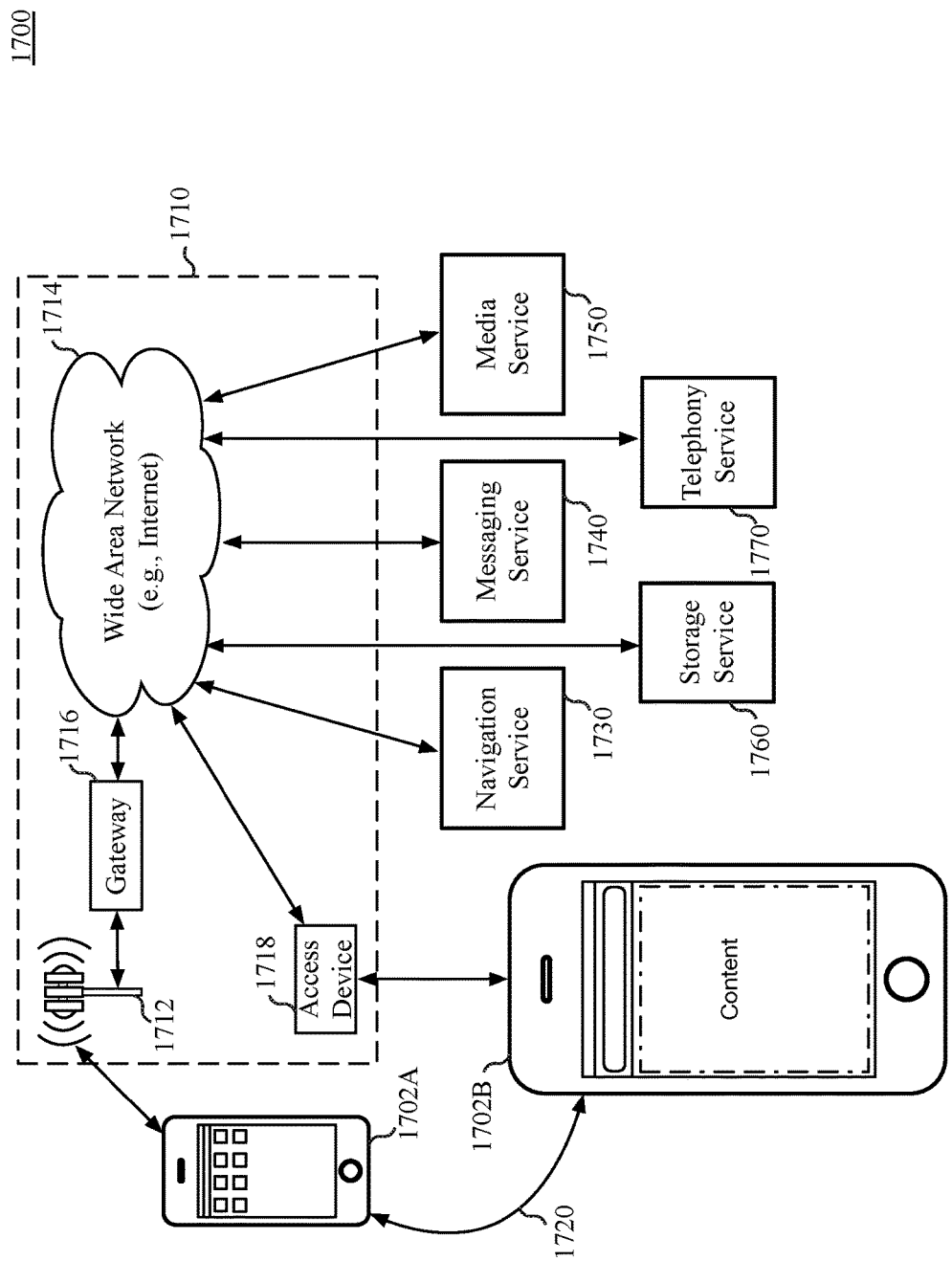
FIG. 17 is a block diagram of an example network operating environment for mobile devices, according to an embodiment.

FIG. 17 is a block diagram of an example network operating environment 1700 for mobile devices, according to an embodiment. Mobile device 1702A and mobile device 1702B can, for example, communicate 1720 over one or more wired and/or wireless networks 1710 to perform data communication. For example, a wireless network 1712, e.g., a cellular network, can communicate with a wide area network 1714, such as the Internet, by use of a gateway 1716. Likewise, an access device 1718, such as a mobile hotspot wireless access device, can provide communication access to the wide area network 1714.

In some implementations, both voice and data communications can be established over the wireless network 1712 and/or the access device 1718. For example, mobile device 1702A can place and receive phone calls (e.g., using VoIP protocols), send and receive e-mail messages (e.g., using POP3 protocol), and retrieve electronic documents and/or streams, such as web pages, photographs, and videos, over the wireless network 1712, gateway 1716, and wide area network 1714 (e.g., using TCP/IP or UDP protocols). In some implementations, mobile device 1702A can place and receive phone calls, send and receive e-mail messages, and retrieve electronic documents over the access device 1718 and the wide area network 1714. In some implementations, mobile device 1702A or mobile device 1702B can be physically connected to the access device 1718 using one or more cables and the access device 1718 can be a personal computer. In this configuration, mobile device 1702A or mobile device 1702B can be referred to as a "tethered" device.

Mobile device 1702A or mobile device 1702B can communicate with one or more services, such as a navigation service 1730, a messaging service 1740, a media service 1750, a storage service 1760, and a telephony service 1770 over the one or more wired and/or wireless networks 1710. For example, the navigation service 1730 can provide navigation information, e.g., map information, location information, route information, and other information. The messaging service 1740 can, for example, provide e-mail and/or other messaging services. The media service 1750 can, for example, provide access to media files, such as song files, audio books, movie files, video clips, and other media data. A storage service 1760 can provide network storage capabilities to mobile device 1702A and mobile device 1702B to store documents and media files. A telephony service 1770 can enable telephonic communication between mobile device 1702A and mobile device 1702B, or between a mobile device and a wired telephonic device. The telephony service 1770 can route voice over IP (VoIP) calls over the wide area network 1714 or can access a cellular voice network (e.g., wireless network 1712). Other services can also be provided, including a software update service to update operating system software or client software on the mobile devices.

Mobile device 1702A or 1702B can also access other data and content over the one or more wired and/or wireless networks 1710. For example, content publishers, such as news sites, RSS feeds, web sites, blogs, social networking sites, developer networks, etc., can be accessed via a web browser as described herein. For example, mobile device 1702A and/or mobile device 1702B can execute browser software to access web sites provided by servers accessible via the wide area network 1714.

Figure 18:
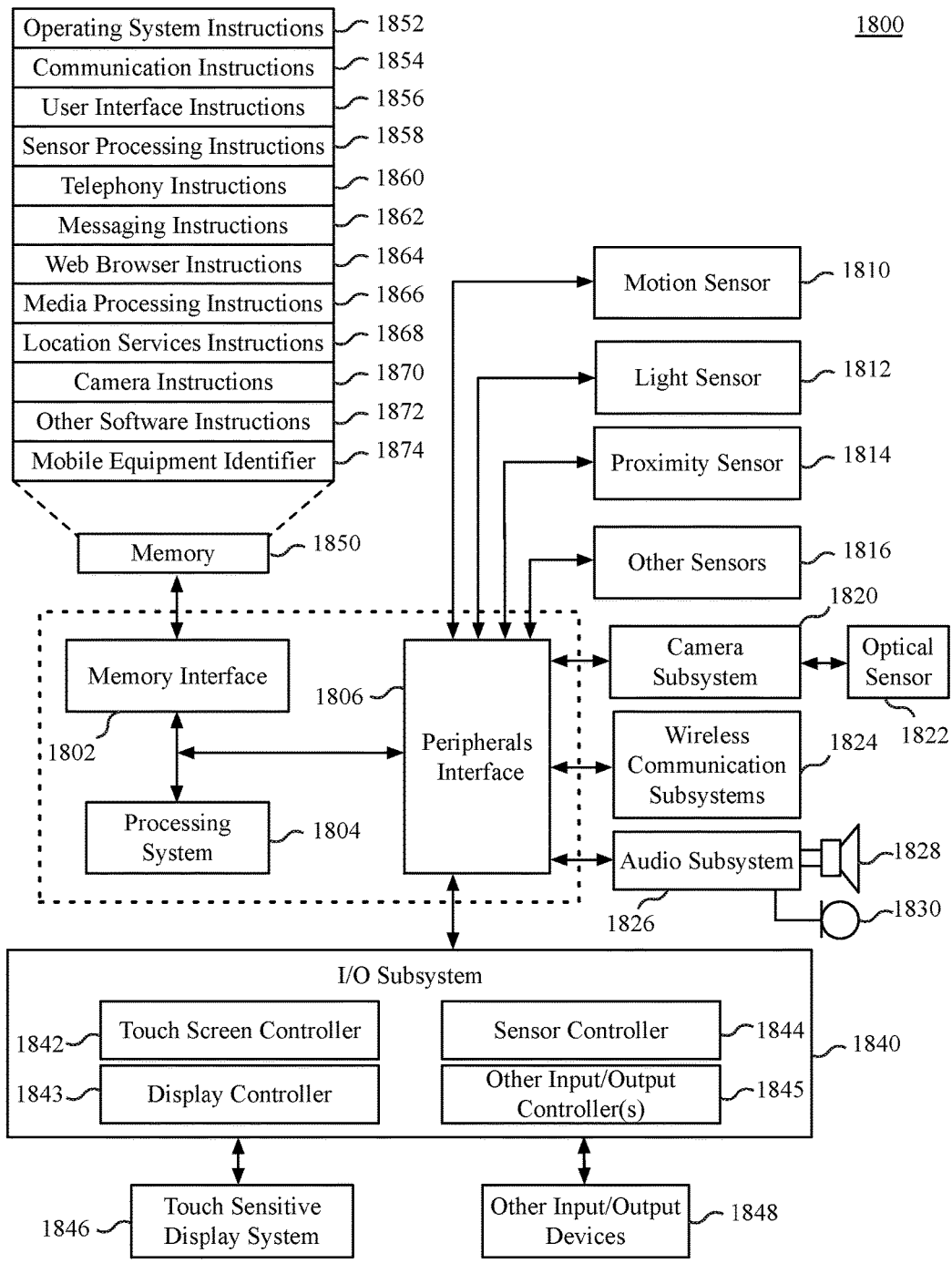
FIG. 18 is a block diagram of mobile device architecture, according to an embodiment.

FIG. 18 is a block diagram of mobile device architecture 1800, according to an embodiment. The mobile device architecture 1800 includes a include a memory interface 1802, a processing system 1804 including one or more data processors, image processors and/or graphics processing units, and a peripherals interface 1806. The various components can be coupled by one or more communication buses or signal lines. The various components can be separate logical components or devices or can be integrated in one or more integrated circuits, such as in a system on a chip integrated circuit.

The memory interface 1802 can be coupled to memory 1850, which can include high-speed random access memory such as static random access memory (SRAM) or dynamic random access memory (DRAM) and/or non-volatile memory, such as but not limited to flash memory (e.g., NAND flash, NOR flash, etc.).

Sensors, devices, and subsystems can be coupled to the peripherals interface 1806 to facilitate multiple functionalities. For example, a motion sensor 1810, a light sensor 1812, and a proximity sensor 1814 can be coupled to the peripherals interface 1806 to facilitate the mobile device functionality. Other sensors 1816 can also be connected to the peripherals interface 1806, such as a positioning system (e.g., GPS receiver), a temperature sensor, a biometric sensor, or other sensing device, to facilitate related functionalities. A camera subsystem 1820 and an optical sensor 1822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1824, which can include radio frequency receivers and transmitters and/or optical (e.g., infrared) receivers and transmitters. The specific design and implementation of the wireless communication subsystems 1824 can depend on the communication network(s) over which a mobile device is intended to operate. For example, a mobile device including the illustrated mobile device architecture 1800 can include wireless communication subsystems 1824 designed to operate over a GSM network, a CDMA network, an LTE network, a Wi-Fi network, a Bluetooth network, or any other wireless network. In particular, the wireless communication subsystems 1824 can provide a communications mechanism over which a client browser application can retrieve resources from a remote web server.

An audio subsystem 1826 can be coupled to a speaker 1828 and a microphone 1830 to facilitate voice-enabled functions, such as voice recognition, voice replication, digital recording, and telephony functions.

The I/O subsystem 1840 can include a touch screen controller 1842 and/or other input controller(s) 1845. The touch screen controller 1842 can be coupled to a touch sensitive display system 1846. The touch sensitive display system 1846 and touch screen controller 1842 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1846. Display output for the touch sensitive display system 1846 can be generated by a display controller 1843. In one embodiment the display controller 1643 can provide frame data to the touch sensitive display system 1846 at a variable frame rate.

In one embodiment a sensor controller 1844 is included to monitor, control, and/or processes data received from one or more of the motion sensor 1810, light sensor 1812, proximity sensor 1814, or other sensors 1816. The sensor controller 1844 can include logic to interpret sensor data to determine the occurrence of one of more motion events or activities by analysis of the sensor data from the sensors.

In one embodiment the I/O subsystem 1840 includes other input controller(s) 1845 that can be coupled to other input/control devices 1848, such as one or more buttons, rocker switches, thumb-wheel, infrared port, USB port, and/or a pointer device such as a stylus, or control devices such as an up/down button for volume control of the speaker 1828 and/or the microphone 1830.

In one embodiment, the memory 1850 coupled to the memory interface 1802 can store instructions for an operating system 1852, including portable operating system interface (POSIX) compliant and non-compliant operating system or an embedded operating system. The operating system 1852 may include instructions for handling basic system services and for performing hardware dependent tasks. In some implementations, the operating system 1852 can be a kernel.

The memory 1850 can also store communication instructions 1854 to facilitate communicating with one or more additional devices, one or more computers and/or one or more servers, for example, to retrieve web resources from remote web servers. The memory 1850 can also include user interface instructions 1856, including graphical user interface instructions to facilitate graphic user interface processing.

Additionally, the memory 1850 can store sensor processing instructions 1858 to facilitate sensor-related processing and functions; telephony instructions 1860 to facilitate telephone-related processes and functions; messaging instructions 1862 to facilitate electronic-messaging related processes and functions; web browser instructions 1864 to facilitate web browsing-related processes and functions; media processing instructions 1866 to facilitate media processing-related processes and functions; location services instructions including GPS and/or navigation instructions 1868 and Wi-Fi based location instructions to facilitate location based functionality; camera instructions 1870 to facilitate camera-related processes and functions; and/or other software instructions 1872 to facilitate other processes and functions, e.g., security processes and functions, and processes and functions related to the systems. The memory 1850 may also store other software instructions such as web video instructions to facilitate web video-related processes and functions; and/or web shopping instructions to facilitate web shopping-related processes and functions. In some implementations, the media processing instructions 1866 are divided into audio processing instructions and video processing instructions to facilitate audio processing-related processes and functions and video processing-related processes and functions, respectively. A mobile equipment identifier, such as an International Mobile Equipment Identity (IMEI) 1874 or a similar hardware identifier can also be stored in memory 1850.

Each of the above identified instructions and applications can correspond to a set of instructions for performing one or more functions described above. These instructions need not be implemented as separate software programs, procedures, or modules. The memory 1850 can include additional instructions or fewer instructions. Furthermore, various functions may be implemented in hardware and/or in software, including in one or more signal processing and/or application specific integrated circuits.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A display system to generate and display data on a display device, the display system comprising:
    one or more graphics processors to generate one or more frames of data for display on the display device;
    display logic to receive a request to display the one or more frames of data, the request including a requested presentation time in which the one or more frames of data are to be displayed;
    a display engine to present the one or more frames of data to the display device for display at a target presentation time, the target presentation time derived from the requested presentation time and represented by a timestamp in a timestamp queue,
    a performance controller to adjust performance of the display device based on data about the one or more frames of data;
    wherein the adjusted performance of the display device enables the display engine to adjust a refresh rate of the display device based on the target presentation time of the one or more frames of data, and wherein the display logic is to derive the target presentation time for the one or more frames of data based on an adjustment of the requested presentation time by a programming time for the display engine;
    and wherein the timestamp queue includes complexity data about the one or more frames and the complexity data indicates a complexity of the one or more frames.

2. The display system as in claim 1, wherein the display logic is to generate one or more display events for the display engine, the one or more display events associated with the one or more frames of data.

3. The display system as in claim 2, wherein the one or more display events include the target presentation time of the one or more frames of data.

4. The display system as in claim 3, the one or more display events including a first display event associated with a first frame and a second display event associated with a second frame.

5. The display system as in claim 4, wherein the first display event includes a first target presentation time and the second display event includes a second target presentation time different from the first target presentation time.

6. The display system as in claim 5, wherein the display engine is to refresh the display device at a first refresh rate in response to the first display event and a second refresh rate in response to the second display event.

7. The display system as in claim 6, wherein the display engine is to process the first display event and to explicitly refresh the display device in response to the first display event.

8. The display system as in claim 7, wherein the display engine is further to process the second display event and explicitly refresh the display device in response to the second display event.

9. The display system as in claim 8, wherein the display engine is to not refresh the display device between the first display event and the second display event.

10. A non-transitory machine-readable medium storing instructions which, when executed by one or more processors, cause the one or more processors to perform operations to generate and display data on a display device, the operations comprising:
    receiving a request to display one or more frames of data on a display device, the one or more frames of data generated via the one or more processors, wherein the request includes a requested presentation time in which the one or more frames of data are to be displayed;
    deriving a target presentation time based on the requested presentation time, the target presentation time derived based on a programming time for a display engine and represented by a timestamp in a timestamp queue,
    programming the display engine to present the one or more frames of data to the display device for display;
    adjusting, by a performance controller, performance of the display device based on data about the one or more frames of data, wherein the adjusted performance of the display device enables the display engine to adjust a refresh rate of the display device based on the target presentation time of the one or more frames of data;
    the operations additionally comprising generating one or more display events associated with the one or more frames of data and programming the display engine based on the one or more display events;
    and wherein the timestamp queue includes complexity data about the one or more frames and the complexity data indicates a complexity of the one or more frames.

11. The non-transitory machine-readable medium as in claim 10, the operations additionally comprising processing a first display event at a first target presentation time before programming the display engine to present a first frame to the display device for display, the display engine to trigger a refresh of the display device explicitly to display the first frame and to subsequently refresh the display device at a first refresh rate.

12. The non-transitory machine-readable medium as in claim 11, the operations additionally comprising processing a second display event at a second target presentation time before programming the display engine to present a second frame to the display device for display, the display engine to trigger a refresh of the display device explicitly to display the second frame and to subsequently refresh the display device at a second refresh rate that differs from the first refresh rate.

13. The non-transitory machine-readable medium as in claim 12, wherein the first refresh rate is zero and the display device is not refreshed between the first frame and the second frame.

14. An electronic device comprising:
a variable refresh rate display device;
one or more graphics processors to generate one or more frames of data for display on the variable refresh rate display device;
display logic to receive a request to display the one or more frames of data, the request including a requested presentation time in which the one or more frames of data are to be displayed;
a display engine to present the one or more frames of data to the variable refresh rate display device for display at a target presentation time, the target presentation time derived from the requested presentation time and represented by a timestamp in a timestamp queue;
a performance controller to adjust performance of the display device based on data about the one or more frames of data;
wherein the adjusted performance of the display device enables the display engine to adjust a refresh rate of the variable refresh rate display device based on the target presentation time of the one or more frames of data;
wherein the display logic is to derive the target presentation time for the one or more frames of data based on an adjustment of the requested presentation time by a programming time for the display engine and to generate one or more display events for the display engine, wherein the one or more display events are associated with the one or more frames of data and include the target presentation time of the one or more frames of data;
and wherein the timestamp queue includes complexity data about the one or more frames and the complexity data indicates a complexity of the one or more frames.

15. The electronic device as in claim 14, the one or more display events including a first display event associated with a first frame and a second display event associated with a second frame, the first display event including a first target presentation time and the second display event including a second target presentation time different from the first target presentation time.

16. The electronic device as in claim 15, wherein the display engine is to refresh the variable refresh rate display device at a first refresh rate in response to the first display event and a second refresh rate in response to the second display event.

17. The electronic device as in claim 15, the display engine to process the first display event, explicitly refresh the display device in response to the first display event, process the second display event, explicitly refresh the display device in response to the second display event, and not refresh the display device between the first display event and the second display event.

\* \* \* \* \*